(12) United States Patent
Tanaka et al.

(10) Patent No.: US 9,768,879 B2
(45) Date of Patent: Sep. 19, 2017

(54) DEVICE AND METHOD FOR TRANSMITTING MULTICARRIER SIGNALS

(71) Applicant: FUJITSU LIMITED, Kawasaki-shi, Kanagawa (JP)

(72) Inventors: Toshiki Tanaka, Setagaya (JP); Masato Nishihara, Kawasaki (JP); Tomoo Takahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/976,830

(22) Filed: Dec. 21, 2015

(65) Prior Publication Data

US 2016/0197679 A1  Jul. 7, 2016

(30) Foreign Application Priority Data

Jan. 7, 2015 (JP) ................................. 2015-001874

(51) Int. Cl.
    *H04J 14/02* (2006.01)
    *H04B 10/572* (2013.01)
    *H04L 27/26* (2006.01)

(52) U.S. Cl.
    CPC ............ *H04B 10/572* (2013.01); *H04J 14/02* (2013.01); *H04J 14/0298* (2013.01); *H04L 27/2627* (2013.01)

(58) Field of Classification Search
    CPC ................ H04B 10/564; H04B 10/503; H04B 10/2504; H04B 10/07953; H04B 10/5161; H04J 14/02; H04J 14/0298
    (Continued)

(56) References Cited

U.S. PATENT DOCUMENTS 5,995,254 A   11/1999 Koga et al.
8,064,897 B2  11/2011 Matsumoto et al.
(Continued)

FOREIGN PATENT DOCUMENTS

EP   2797248    10/2014
JP   9-191291    7/1997
(Continued)

OTHER PUBLICATIONS

EESR—The Extended European Search Report dated May 30, 2016 in corresponding EP application No. 15198636.1.
USOA—Non-Final Rejection of U.S. Appl. No. 15/253,431, dated Apr. 21, 2017.
USOA—Notice of Allowance dated Aug. 9, 2017 for related U.S. Appl. No. 15/253,431 [allowed].

*Primary Examiner* — Hanh Phan
(74) *Attorney, Agent, or Firm* — Fujitsu Patent Center

(57) ABSTRACT

A transmission device includes: a plurality of modulators that respectively generate multicarrier signals from given data; a distributor that distributes input data to the modulators; an optical circuit that multiplexes the multicarrier signals to generate a WDM optical signal; and a controller that obtains allocation information from a receiver of the WDM optical signal and generates a distribution instruction to control the distributor and a bit allocation instruction to control the modulators according to the allocation information. The allocation information is calculated based on transmission characteristics of each subcarrier of the respective multicarrier signals and the allocation information indicates a number of bits of data allocated to each of the subcarriers. The distributor distributes the input data to the modulators according to the distribution instruction. The modulators respectively allocate data distributed from the distributor to the subcarriers according to the bit allocation instruction to generate the multicarrier signals.

8 Claims, 17 Drawing Sheets

(58) Field of Classification Search
USPC ....... 398/182, 183, 188, 192, 193, 194, 195,
398/196, 197, 198, 199, 79, 158, 159, 33,
398/38, 25, 26, 27, 135, 136, 202, 208,
398/209, 162, 76
See application file for complete search history.

(56) References Cited

U.S. PATENT DOCUMENTS

| | | | |
|---|---|---|---|
| 2002/0005967 A1 | 1/2002 | Suzuki | |
| 2002/0031113 A1 | 3/2002 | Dodds et al. | |
| 2013/0209093 A1 | 8/2013 | Tanimura et al. | |
| 2016/0112238 A1* | 4/2016 | Ling | H04B 10/50 |
| | | | 375/261 |
| 2016/0142150 A1* | 5/2016 | Lyubomirsky | H04J 14/0257 |
| | | | 398/182 |
| 2016/0197679 A1 | 7/2016 | Tanaka et al. | |
| 2017/0070286 A1 | 3/2017 | Nishihara et al. | |

FOREIGN PATENT DOCUMENTS

| | | |
|---|---|---|
| JP | 2002-26822 | 1/2002 |
| JP | 2005-244958 | 9/2005 |
| JP | 2006-135487 | 5/2006 |
| JP | 2013-48373 | 3/2013 |
| JP | 2013-165407 | 8/2013 |
| WO | 02/065671 | 8/2002 |

* cited by examiner

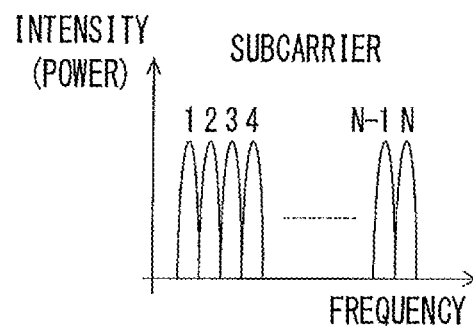
F I G. 2 A
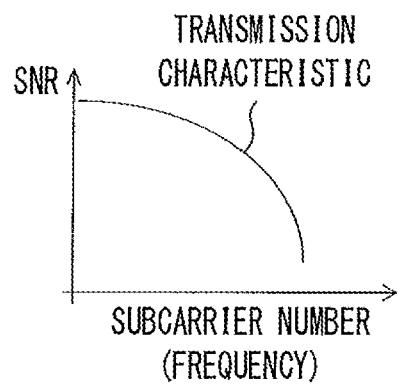
F I G. 2 B
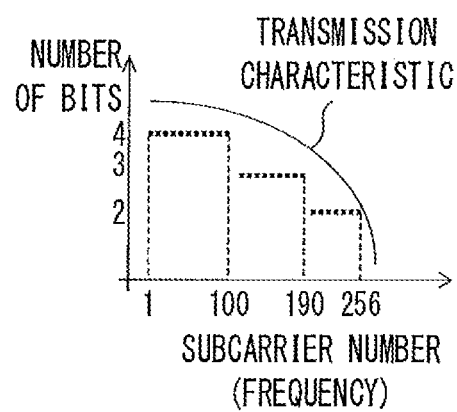
F I G. 2 C

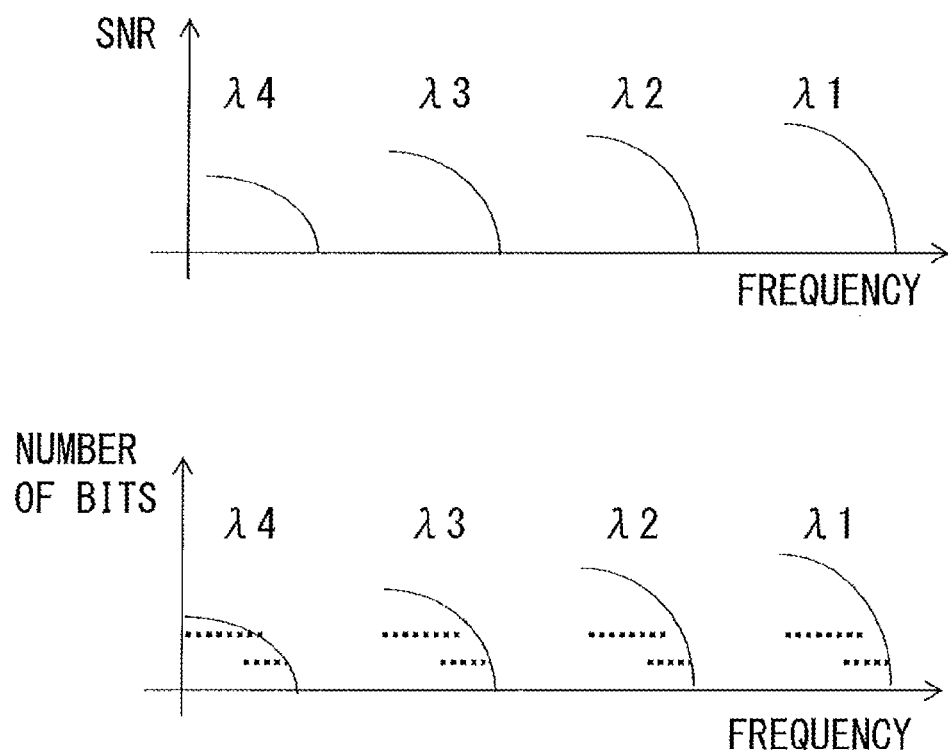
F I G. 5

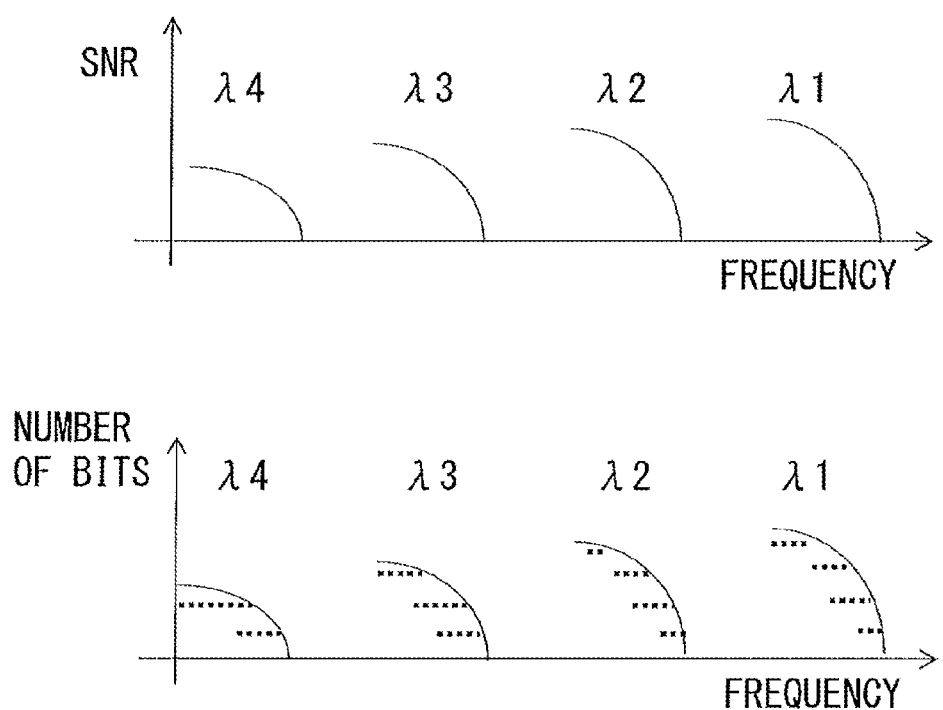
F I G. 6

| WAVELENGTH | SUBCARRIER | SNR[dB] | NUMBER OF BITS |
|---|---|---|---|
| $\lambda 1$ | SC1 | 20.5 | 4 |
| | SC2 | 19.6 | 4 |
| | SC3 | 18.4 | 4 |
| | SC4 | 17.6 | 4 |
| $\lambda 2$ | SC1 | 19.5 | 4 |
| | SC2 | 18.4 | 4 |
| | SC3 | 17.3 | 2 → 4 |
| | SC4 | 16.5 | 2 |
| $\lambda 3$ | SC1 | 18.5 | 4 |
| | SC2 | 17.7 | 4 |
| | SC3 | 16.4 | 2 |
| | SC4 | 15.5 | 2 |
| $\lambda 4$ | SC1 | 17.4 | 2 → 4 |
| | SC2 | 16.5 | 2 |
| | SC3 | 15.7 | 2 |
| | SC4 | 14.5 | 2 |

16QAM ALLOWABLE SNR : 17.5dB
QPSK ALLOWABLE SNR : 14.0dB
TOTAL REQUESTED NUMBER OF BITS : 52

F I G. 1 1

DEVICE AND METHOD FOR TRANSMITTING MULTICARRIER SIGNALS

CROSS-REFERENCE TO RELATED APPLICATION

This application is based upon and claims the benefit of priority of the prior Japanese Patent Application No. 2015-001874, filed on Jan. 7, 2015, the entire contents of which are incorporated herein by reference.

FIELD

The embodiments discussed herein are related to a device and method for transmitting multicarrier signals.

BACKGROUND

In recent years, as a form of a technology for improving a data transmission rate, Discrete Multi-Tone (DMT) modulation has been considered actively. DMT is a form of a multicarrier transmission scheme, and data is transmitted by using a plurality of subcarriers. Namely, in the DMT modulation, a plurality of subcarriers are allocated to one communication band. Data is transmitted by using each of the plurality of subcarriers. Therefore, by allocating many subcarriers to one signal band, large-capacity data transmission is realized without increasing a transmission rate of each of the subcarriers.

A communication system including the following transmitter station and receiver station has been proposed. The transmitter station divides a communication band into a plurality of data channels and one or more standby channels, and transmits data by using the data channels and at least one of the standby channels. The receiver station includes a communication quality measurement unit that measures communication quality for each channel for transmitting data, and an adaptive controller that, when there is a data channel with low communication quality, allocates, to the standby channel, at least some bits of bits to be allocated to the data channel with low communication quality. The transmitter station transmits data according to a bit allocation result obtained from the receiver station (for example, Japanese Laid-open Patent Publication No. 2013-48373).

In addition, related technologies are described in Japanese Laid-open Patent Publication No. 2002-26822, Japanese Laid-open Patent Publication No. 2005-244958, and Japanese Laid-open Patent Publication No. 2013-165407.

Meanwhile, as a form of a technology for achieving an increase in a capacity of a communication system, Wavelength Division Multiplexing (WDM) has been widely used. In WDM, data is transmitted by using plural different wavelengths. Namely, in WDM, a plurality of wavelength channels are multiplexed. Thus if DTM modulation is applied to the respective wavelength channels in WDM, it is expected that communication capacity further increases.

However, in WDM transmission, deterioration in quality of an optical signal depends on a wavelength. Therefore, efficient transmission may fail to be achieved only by applying DMT modulation to the respective wavelength channels in WDM.

SUMMARY

According to an aspect of the embodiments, a transmission device includes: a plurality of modulators that respectively generate multicarrier signals from given data, each of the multicarrier signals including a plurality of subcarriers; a distributor that distributes input data to the plurality of modulators; an optical circuit that multiplexes the multicarrier signals generated by the plurality of modulators to generate a WDM (wavelength division multiplexed) optical signal; and a controller that obtains allocation information from a receiver that receives the WDM optical signal and generates a distribution instruction to control the distributor and a bit allocation instruction to control the plurality of modulators according to the allocation information, the allocation information being calculated based on transmission characteristics of each subcarrier of the respective multicarrier signals and the allocation information indicating a number of bits of data allocated to each of the subcarriers. The distributor distributes the input data to the plurality of modulators according to the distribution instruction. The plurality of modulators respectively allocate data distributed from the distributor to the subcarriers according to the bit allocation instruction to generate the multicarrier signals.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A-2C are diagrams explaining DMT modulation.

FIG. 5 is a diagram explaining a problem in a case in which input data is distributed equally to respective wavelength channels.

FIG. 6 schematically illustrates bit allocation according to the first embodiment.

FIG. 11 illustrates an example of bit allocation according to the first embodiment.

DESCRIPTION OF EMBODIMENTS

An optical transmission system according to the embodiments transmits a WDM optical signal. In WDM, a plurality of wavelength channels are multiplexed. To the respective wavelength channels in WDM, DMT modulation is applied. First, a method for transmitting a DMT signal via one wavelength channel is described below. DMT is a form of a multicarrier transmission scheme, and data is transmitted by using a plurality of subcarriers.

Figure 1:
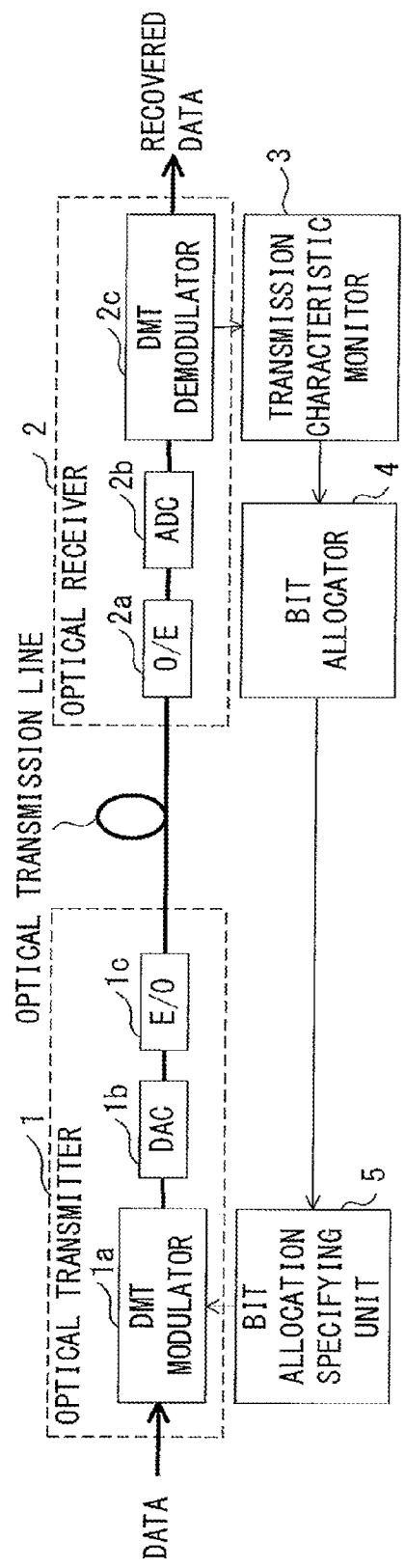
FIG. 1 illustrates an example of an optical transmission system that transmits data by using DMT modulation.

FIG. 1 illustrates an example of an optical transmission system that transmits data by using DMT modulation. Here, it is assumed that an optical DMT signal is transmitted from an optical transmitter 1 to an optical receiver 2. Between the optical transmitter 1 and the optical receiver 2, an optical fiber transmission line is provided. On the optical fiber transmission line, one or more optical amplifiers may be provided.

The optical transmitter 1 includes a DMT modulator 1a, a D/A (Digital-to-Analog) converter 1b, and an E/O (Electric-to-Optical) device 1c. The DMT modulator 1a generates a DMT signal from data. At this time, data is divided, and is allocated to a plurality of subcarriers. Therefore, even when high-speed data is transmitted, the speed of data allocated to the respective subcarriers is not so high. Note that frequencies of the plurality of subcarriers are different from each other.

The D/A converter 1b converts the DMT signal generated by the DMT modulator 1a into an analog signal. The E/O device 1c generates an optical DMT signal from an analog DMT signal. The E/O device 1c is realized, for example, by a direct modulation laser device.

FIG. 2A illustrates an example of a spectrum of an optical DMT signal. In this example, data is transmitted by using n subcarriers 1-N in DMT modulation. Optical intensities (or optical powers) of the respective subcarriers are approximately equalized. The optical DMT signal is transmitted via the optical fiber transmission line, and is received by the optical receiver 2.

The optical receiver 2 includes an O/E (Optical-to-Electric) device 2a, an A/D (Analog-to-Digital) converter 2b, and a DMT demodulator 2c. The O/E device 2a converts the received optical DMT signal into an electrical signal. The O/E device 2a is configured so as to include, for example, a photodiode. The A/D converter 2b converts a signal output from the O/E device 2a into a digital signal. The DMT demodulator 2c performs DMT demodulation on the digital signal output from the A/D converter 2b so as to recover data.

In the optical transmission system with the configuration above, allocation of data to the respective subcarriers is determined, for example, according to a transmission characteristic between transmission devices. The transmission characteristic is determined based on a Signal-to-Noise Ratio (SNR) monitored, for example, in an optical transmission device on a reception side. Namely, a transmission characteristic monitor 3 monitors an SNR of the optical DMT signal received from the optical transmitter 1. In this case, the transmission characteristic monitor 3 monitors the SNR for each of the subcarriers.

FIG. 2B illustrates an example of a transmission characteristic measured by the transmission characteristic monitor 3. The horizontal axis represents a subcarrier number (1-N) for identifying respective subcarriers. The vertical axis represents an SNR. In this example, the transmission characteristic is satisfactory in a frequency region for subcarriers with a small subcarrier numbers, and the transmission characteristic deteriorates in a frequency region for subcarriers with a large subcarrier numbers.

A bit allocator 4 determines bit allocation to respective subcarriers in accordance with the transmission characteristic measured by the transmission characteristic monitor 3. Namely, the number of bits transmitted per symbol is determined for each of the subcarriers. In this case, the number of bits that are allocated to a subcarrier with a high SNR is large, and the number of bits that are allocated to a subcarrier with a low SNR is small. In the example illustrated in FIG. 2C, "4 bits" is allocated respectively to subcarriers 1-100, "3 bits" is allocated respectively to subcarriers 101-190, and "2 bits" is allocated respectively to subcarriers 191-256.

A bit allocation specifying unit 5 specifies a modulation scheme for each of the subcarriers in accordance with the bit allocation determined by the bit allocator 4. As an example, for a subcarrier to which "2 bits" is allocated, a modulation scheme that corresponds to QPSK is specified. For a subcarrier to which "3 bits" is allocated, a modulation scheme that corresponds to 8PSK is specified. For a subcarrier to which "4 bits" is allocated, a modulation scheme that corresponds to 16QAM is specified. Then, the DMT modulator 1a modulates the respective subcarriers in the modulation schemes specified by the bit allocation specifying unit 5.

In the configuration illustrated in FIG. 1, the optical transmitter 1 and the bit allocation specifying unit 5 are provided in a transmission device on a transmission side, and the optical receiver 2, the transmission characteristic monitor 3, and the bit allocator 4 are provided in a transmission device on a reception side. However, the invention is not limited to this configuration. Namely, as an example, the bit allocator 4 may be provided in the transmission device on the transmission side. In this case, a measurement result of the transmission characteristic monitor 3 is reported from the transmission device on the reception side to the transmission device on the transmission side.

First Embodiment

Figure 3:
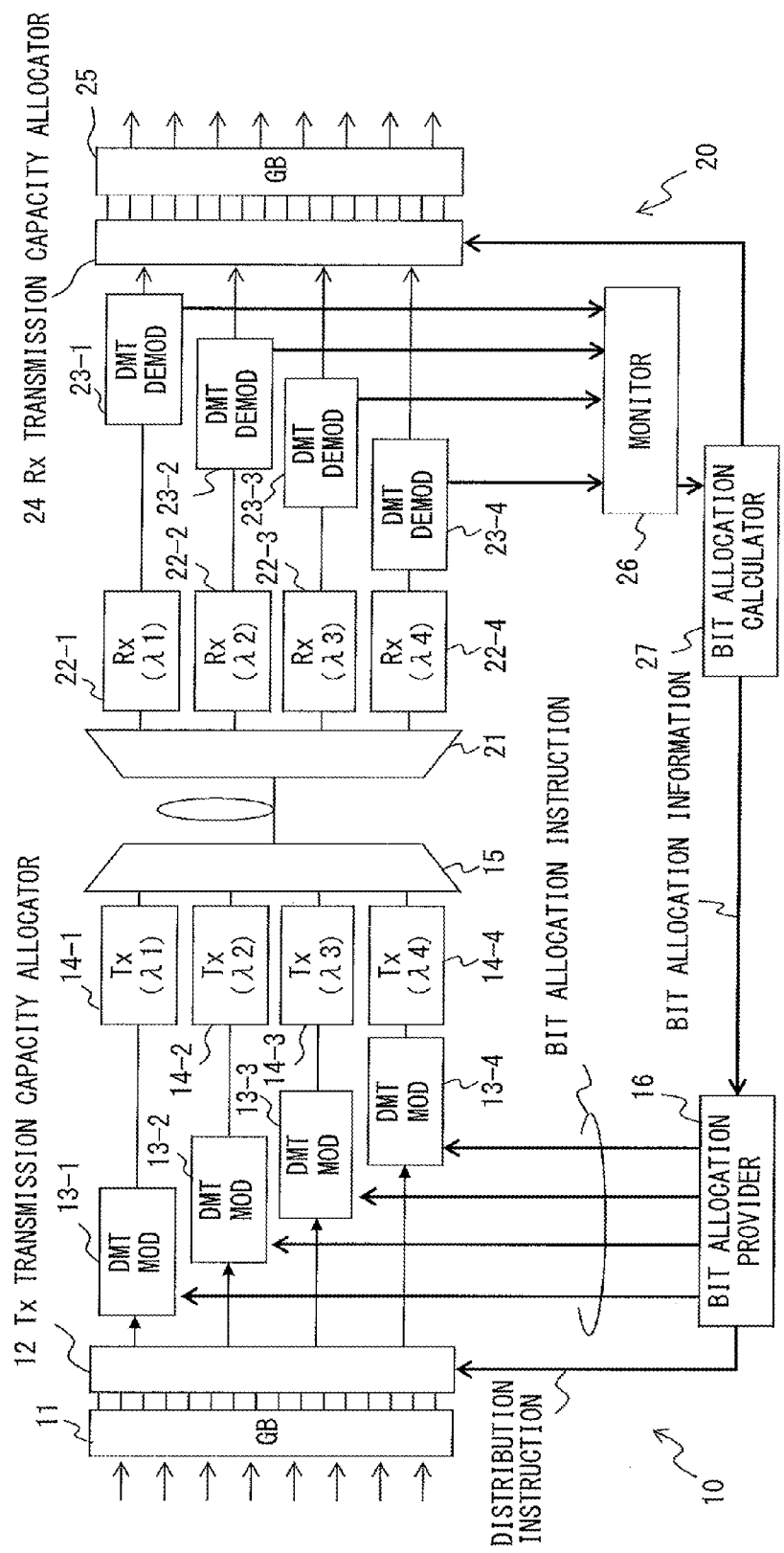
FIG. 3 illustrates an example of an optical transmission system according to the first embodiment.

FIG. 3 illustrates an example of an optical transmission system according to the first embodiment. The optical transmission system according to the first embodiment includes a transmission device 10 provided on a transmission side, and a transmission device 20 provided on a reception side. Between the transmission devices 10 and 20, an optical fiber transmission line is provided. On the optical fiber transmission line, one or more optical amplifiers may be provided.

The transmission device 10 includes a gearbox 11, a Tx transmission capacity allocator 12, DMT modulators 13-1 to 13-4, optical transmitters 14-1 to 14-4, an optical multiplexer 15, and a bit allocation provider 16. The transmission device 10 may include other circuit elements. As an example, the transmission device 10 may include a circuit that receives and processes an optical signal.

The gearbox 11 converts the number of signals transmitted in parallel. Namely, the gearbox 11 can convert m data signals transmitted in parallel into n data signals transmitted in parallel. The gearbox 11 has the SerDes (Serializer/Deserializer) function. However, when there is no necessity to convert the number of data signals transmitted in parallel, the gearbox 11 is not provided.

The Tx transmission capacity allocator 12 allocates transmission capacities for transmitting a data signal respectively to the modulators 13-1 to 13-4. Namely, the Tx transmission capacity allocator 12 operates as a distributor that distributes input data to the modulators 13-1 to 13-4. At this time, the Tx transmission capacity allocator 12 distributes the input data to the modulators 13-1 to 13-4 in accordance with a distribution instruction issued from the bit allocation provider 16.

Each of the DMT modulators 13-1 to 13-4 generates a DMT signal from distributed data. At this time, each of the DMT modulators 13-1 to 13-4 allocates the distributed data to a plurality of subcarriers, as described with reference to FIG. 2A. Allocation to the plurality of subcarriers is performed according to a bit allocation instruction issued from the bit allocation provider 16. The bit allocation instruction indicates the number of bits per symbol for each of the subcarriers, as illustrated in FIG. 2C. Each of the DMT modulators 13-1 to 13-4 determines a modulation scheme for each of the subcarriers in accordance with the bit allocation instruction.

The optical transmitters 14-1 to 14-4 respectively generate modulated optical signals from the DMT signals generated by the DMT modulators 13-1 to 13-4. Center wavelengths (or carrier light wavelengths) of the modulated optical signals generated by the optical transmitters 14-1 to 14-4 are different from each other. Each of the optical transmitters 14-1 to 14-4 includes, for example, a laser light source. The optical multiplexer 15 multiplexes a plurality of modulated optical signals generated by the optical transmitters 14-1 to 14-4 so as to generate a WDM optical signal. Namely, a plurality of DMT signals generated by the DMT modulators 13-1 to 13-4 are transmitted via a plurality of wavelength channels.

The bit allocation provider 16 generates the distribution instruction and the bit allocation instruction in accordance with bit allocation information obtained from the transmission device 20 on the reception side. The distribution instruction indicates, for example, a ratio of the number of bits distributed to the DMT modulators 13-1 to 13-4. The bit allocation instruction indicates the number of bits per symbol for each of the subcarriers. Alternatively, the bit allocation instruction may indicate a modulation scheme for each of the subcarriers.

The WDM optical signal generated by the transmission device 10 is transmitted via the optical fiber transmission line, and is received by the transmission device 20. The transmission device 20 includes an optical demultiplexer 21, optical receivers 22-1 to 22-4, DMT demodulators 23-1 to 23-4, an Rx transmission capacity allocator 24, a gearbox 25, a transmission characteristic monitor 26, and a bit allocation calculator 27. The transmission device 20 may include other circuit elements. As an example, the transmission device 20 may include a circuit that generates an optical signal from input data and transmits the optical signal.

The optical demultiplexer 21 demultiplexes the received WDM optical signal for each wavelength, and guides the demultiplexed signals to the optical receivers 22-1 to 22-4. In the example illustrated in FIG. 3, optical signals of wavelength channels λ1-λ4 that have been multiplexed into the received WDM optical signal are respectively guided to the optical receivers 22-1 to 22-4. The optical receivers 22-1 to 22-4 respectively convert the received optical signals into electrical signals. As a result, DMT signals are recovered. Namely, a plurality of DMT signals are recovered by the optical demultiplexer 21 and the optical receivers 22-1 to 22-4.

The DMT demodulators 23-1 to 23-4 respectively recover data signals from corresponding DMT signals. The DMT demodulators 23-1 to 23-4 can recover data signals from DMT signals, for example, by performing inverse processes of modulation processes by the DMT modulators 13-1 to 13-4.

The Rx transmission capacity allocator 24 allocates transmission capacities for receiving a data signal to the DMT demodulators 23-1 to 23-4. Namely, the Rx transmission capacity allocator 24 converts data signals recovered by the DMT demodulators 23-1 to 23-4 into a plurality of data signals transmitted in parallel. At this time, the Rx transmission capacity allocator 24 converts data signals according to a calculation result of the bit allocation calculator 27. Note that the Rx transmission capacity allocator 24 performs, for example, an inverse process of a distribution operation by the Tx transmission capacity allocator 12.

The gearbox 25 converts the number of signals transmitted in parallel. Namely, the gearbox 25 can convert n data signals transmitted in parallel into m data signals transmitted in parallel. The gearbox 25 also has the SerDes function. However, when there is no necessity to convert the number of data signals transmitted in parallel, the gearbox 25 is not provided.

The transmission characteristic monitor 26 detects a transmission characteristic for each of the subcarriers of a plurality of DMT signals. The detected transmission characteristic is, for example, a Signal-to-Noise Ratio (hereinafter referred to as an "SNR"). Namely, the transmission characteristic monitor 26 detects SNRs for all of the subcarriers. The transmission characteristic monitor 26 may detect another transmission characteristic for each of the subcarriers. As an example, the transmission characteristic monitor 26 may detect a bit error rate for each of the subcarriers.

The bit allocation calculator 27 generates bit allocation information according to the transmission characteristic for each of the subcarriers that is detected by the transmission characteristic monitor 26. The bit allocation information indicates the number of bits of data allocated to each of the subcarriers (or a modulation scheme of each of the subcarriers). When the transmission characteristic detected by the transmission characteristic monitor 26 is the SNR, the bit allocation calculator 27 compares the SNR of each of the subcarriers with a specified threshold so as to determine the number of bits allocated to each of the subcarriers. In this case, a large number of bits is allocated to a subcarrier with a high SNR, and a small number of bits is allocated to a subcarrier with a low SNR. Stated another way, a modulation scheme with a large multilevel number is specified for a subcarrier with a high SNR, and a modulation scheme with a small multilevel number is specified for a subcarrier with a low SNR.

The bit allocation information generated by the bit allocation calculator 27 is reported to the bit allocation provider 16. Then, the bit allocation provider 16 generates the distribution instruction and the bit allocation instruction described above in accordance with the obtained bit allocation information. Namely, the transmission device 10 performs allocation of a transmission capacity to each of the wavelength channels, and bit allocation to each of the subcarriers in accordance with a transmission characteristic of each of the subcarriers for transmitting a plurality of DMT signals.

In the transmission device 20, the DMT demodulators 23-1 to 23-4 perform demodulation that corresponds to modulation of the DMT modulators 13-1 to 13-4. The Rx transmission capacity allocator 24 performs an inverse process of the distribution operation by the Tx transmission capacity allocator 12. Accordingly, in the transmission device 20, similarly to the transmission device 10, the DMT demodulators 23-1 to 23-4 and the Rx transmission capacity allocator 24 are controlled in accordance with the bit allocation information.

Each of the bit allocation provider 16 and the bit allocation calculator 27 is implemented, for example, by a processor system. The processor system includes a processor element and a memory. Each of the bit allocation provider 16 and the bit allocation calculator 27 may be implemented by a combination of software and hardware.

In the optical transmission system above, the Tx transmission capacity allocator 12 may distribute input data equally to the modulators 13-1 to 13-4. As an example, when a date rate of transmission data is 400 Gbps, the Tx transmission capacity allocator 12 may be configured to distribute a data signal of 100 Gbps respectively to the modulators 13-1 to 13-4. In this case, the DMT signals generated by the modulators 13-1 to 13-4 respectively transmit data of 100 Gbps. Namely, data of 100 Gbps is transmitted via respective wavelength channels $\lambda 1$-$\lambda 4$.

However, in the WDM transmission, quality of an optical signal depends on a wavelength. As an example, a penalty due to chromatic dispersion of an optical fiber depends on a carrier wavelength of an optical signal. Therefore, when data is distributed equally to the respective wavelength channels $\lambda 1$-$\lambda 4$, transmission efficiency may be reduced.

Figure 4:
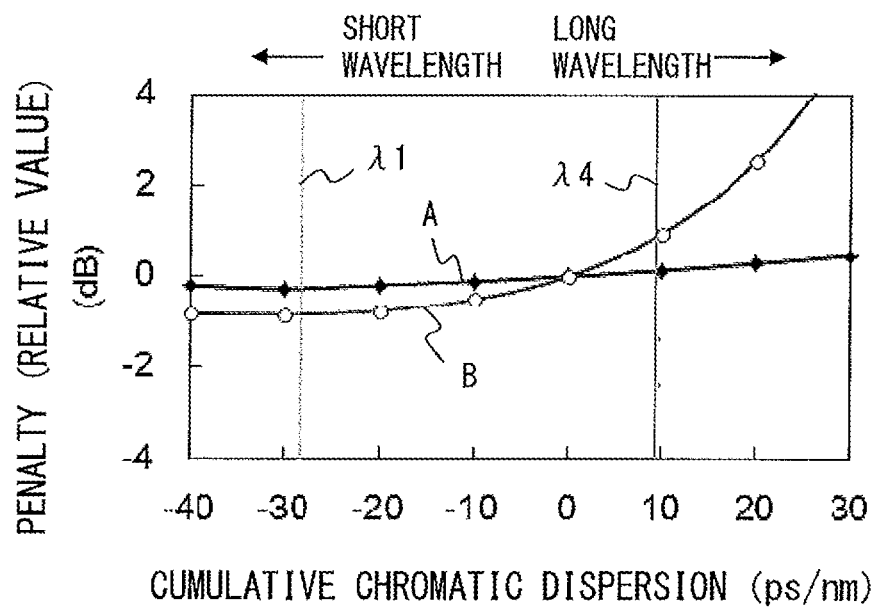
FIG. 4 illustrates a transmission penalty with respect to a wavelength.

FIG. 4 illustrates a transmission penalty with respect to a wavelength. In FIG. 4, the horizontal axis represents a cumulative chromatic dispersion, and the vertical axis represents a relative value of a transmission penalty. Note that the transmission penalty illustrated in FIG. 4 is obtained under the following conditions.

$\lambda 1$-$\lambda 4$: 1295.56 nm to 1309.14 nm
($\lambda 1$: 1295.56 nm, $\lambda 2$: 1300.055 nm, $\lambda 3$: 1304.585 nm, $\lambda 4$: 1309.14 nm)
Light source: DML (Directly Modulated Laser)
Modulation scheme: NRZ
Chirp parameter $\alpha$: 1.0
Optical fiber: SMF of 10 km
Transmission rate of characteristic A: 28 Gbps (approximately 100 Mbps/subcarrier)
Transmission rate of characteristic B: 56 Gbps (approximately 200 Mbps/subcarrier)

In the example illustrated in FIG. 4, as an optical wavelength becomes longer, chromatic dispersion increases. As chromatic dispersion increases, a transmission penalty also increases. However, a change in the transmission penalty with respect to the optical wavelength depends on a transmission rate. Namely, when the transmission rate is low, the change in the transmission penalty with respect to the optical wavelength is small. As an example, in the characteristic A illustrated in FIG. 4, a difference in the transmission penalty between the wavelength $\lambda 1$ and the wavelength $\lambda 4$ is small. When the transmission rate is high, a change in the transmission penalty with respect to the optical wavelength is great. As an example, in the characteristic B illustrated in FIG. 4, the difference in the transmission penalty between the wavelength $\lambda 1$ and the wavelength $\lambda 4$ is approximately 1.5 dB.

FIG. 5 is a diagram explaining a problem in a case in which input data is distributed equally to respective wavelength channels. In this case, when an optical wavelength is long, the SNR is low, and when the optical wavelength is short, the SNR is high. FIG. 5 schematically illustrates SNRs of the wavelength channels $\lambda 1$-$\lambda 4$. In the case in which input data is distributed equally to the respective wavelength channels, bit allocation of the DMT signals to the wavelength channels $\lambda 1$-$\lambda 4$ is the same as each other, as illustrated in FIG. 5.

In this case, bit allocation is determined, for example, for a wavelength channel with the lowest SNR (i.e., $\lambda 4$). The same bit allocation is applied to the other wavelength channels (i.e., $\lambda 1$-$\lambda 3$). However, in this method, a margin of communication quality is large in a wavelength channel with a high SNR, compared with the wavelength channel $\lambda 4$. As an example, in the wavelength channel $\lambda 1$, it is considered that, even when a larger number of bits are allocated, specified communication quality is satisfied. Therefore, data transmission efficiency is reduced.

Accordingly, in the first embodiment, considering transmission characteristics of a plurality of wavelength channels multiplexed into a WDM optical signal, transmission capacities allocated to the respective wavelength channels are determined. Namely, the Tx transmission capacity allocator 12 distributes input data to the DMT modulators 13-1 to 13-4 at a ratio determined according to transmission characteristics of respective subcarriers of respective DMT signals.

FIG. 6 schematically illustrates bit allocation according to the first embodiment. In the first embodiment, a larger number of bits are distributed to a wavelength channel with a high SNR (for example, $\lambda 1$). On the other hand, a smaller number of bits are distributed to a wavelength channel with a low SNR (for example, $\lambda 4$). Thus, according to the first embodiment, data transmission efficiency is improved, compared with the method illustrated in FIG. 5. Bit allocation to subcarriers is implemented, for example, by a method described with reference to FIGS. 2A-2C. However, according to the first embodiment, bit allocation is collectively performed for respective subcarriers of a plurality of wavelength channels.

Figure 7:
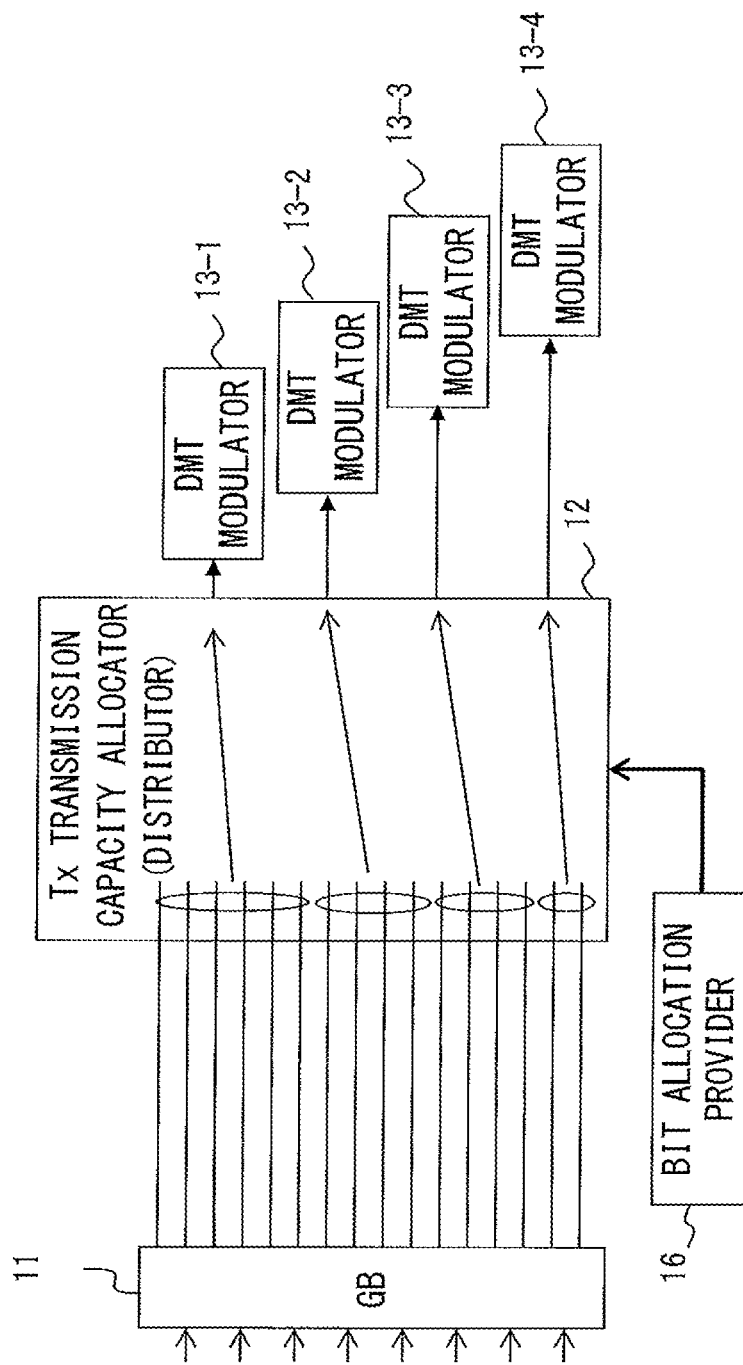
FIG. 7 is a diagram explaining allocation of a transmission capacity.

FIG. 7 is a diagram explaining allocation of a transmission capacity. In this example, data signals are transmitted from the gearbox 11 to the Tx transmission capacity allocator 12 via a plurality of transmission lanes. Transmission rates of the respective transmission lanes are the same as each other.

The Tx transmission capacity allocator 12 distributes data to the DMT modulators 13-1 to 13-4 in accordance with the distribution instruction issued from the bit allocation provider 16. Here, the transmission rates of the transmission lanes between the gearbox 11 and the Tx transmission capacity allocator 12 are the same as each other. Accordingly, the Tx transmission capacity allocator 12 determines the number of transmission lanes allocated to the DMT modulators 13-1 to 13-4 in accordance with the distribution instruction. As an example, to a DMT modulator that generates a DMT signal transmitted via a wavelength channel with high quality (in this example, the DMT modulator 13-1), a larger number of transmission lanes are allocated. To a DMT modulator that generates a DMT signal transmitted via a wavelength channel with low quality (in this example, the DMT modulator 13-4), a smaller number of transmission lanes are allocated.

As an example, a bandwidth of input data is 464 Gbps. The transmission rates of the respective lanes between the gearbox 11 and the Tx transmission capacity allocator 12 are 2 Gbps. Namely, 232 transmission lanes are provided between the gearbox 11 and the Tx transmission capacity allocator 12. Qualities (Q1-Q4) of the wavelength channels $\lambda 1$-$\lambda 4$ are described below.

$Q1 > Q2 > Q3 > Q4$

It is assumed that the following calculation results are obtained by the bit allocation calculator 27. A method for calculating a ratio of the number of bits when distributing data to the DMT modulators 13-1 to 13-4 is described later.

DMT modulator 13-1: 120 Gbps
DMT modulator 13-2: 118 Gbps
DMT modulator 13-3: 114 Gbps
DMT modulator 13-4: 112 Gbps In this case, the Tx transmission capacity allocator 12 multiplexes data signals via 60 transmission lanes and guides the multiplexed data signal to the DMT modulator 13-1, multiplexes data signals via 59 transmission lanes and guides the multiplexed data signal to the DMT modulator 13-2, multiplexes data signals via 57 transmission lanes and guides the multiplexed data signal to the DMT modulator 13-3, and multiplexes data signals via 56 transmission lanes and guides the multiplexed data signal to the DMT modulator 13-4.

Figure 8:
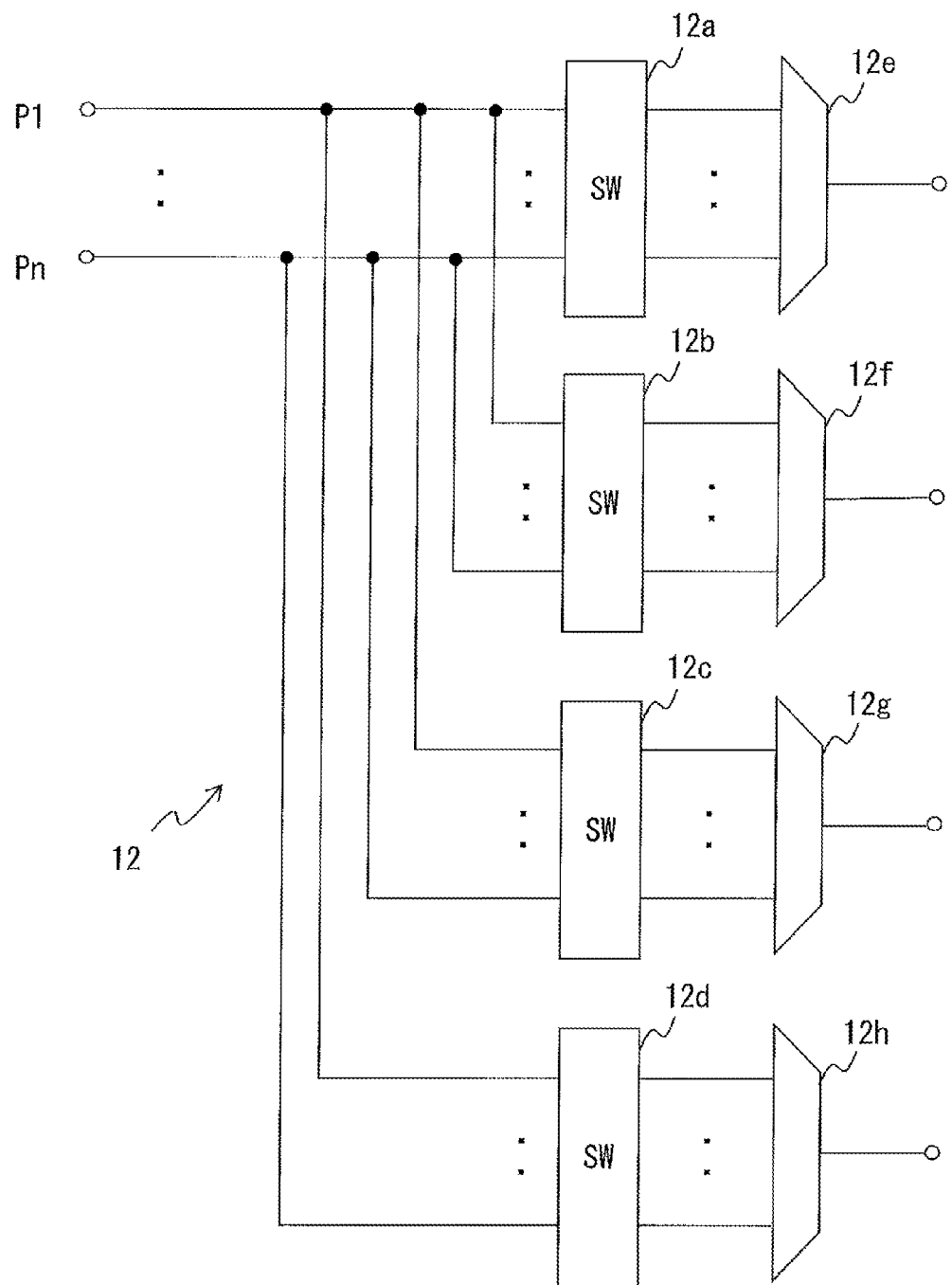
FIG. 8 illustrates an example of a configuration of a Tx transmission capacity allocator.

FIG. 8 illustrates an example of a configuration of the Tx transmission capacity allocator 12. However, the invention is not limited to this configuration.

In the example illustrated in FIG. 8, the Tx transmission capacity allocator 12 includes input ports P1-Pn, switches 12a-12d, and multiplexers 12e-12h. Each of the input ports receives a data signal output from the gearbox 11. Namely, the number of input ports corresponds to the number of transmission lanes provided between the gearbox 11 and the Tx transmission capacity allocator 12.

Data signals input via the input ports P1-Pn are branched, and are guided to the switches 12a-12d. Each of the switches 12a-12d selects input data signals in accordance with the distribution information issued from the bit allocation provider 16. In the example described with reference to FIG. 7, for example, the switch 12a selects data signals input via the input ports P1-P60. The switch 12b selects data signals input via the input ports P61-P119. The switch 12c selects data signals input via the input ports P120-P176. The switch 12d selects data signals input via the input ports P177-P232.

The multiplexers 12e-12h respectively multiplex data signals selected by the switches 12a-12d. In the case above, as an example, the multiplexer 12e multiplexes data signals input via the input ports P1-P60. Data signals multiplexed by the multiplexers 12e-12h are guided to the DMT modulators 13-1 to 13-4, respectively.

A configuration and an operation of the Rx transmission capacity allocator 24 correspond to those of the Tx transmission capacity allocator 12. Namely, the Rx transmission capacity allocator 24 demultiplexes signals received via respective wavelength channels.

Figure 9:
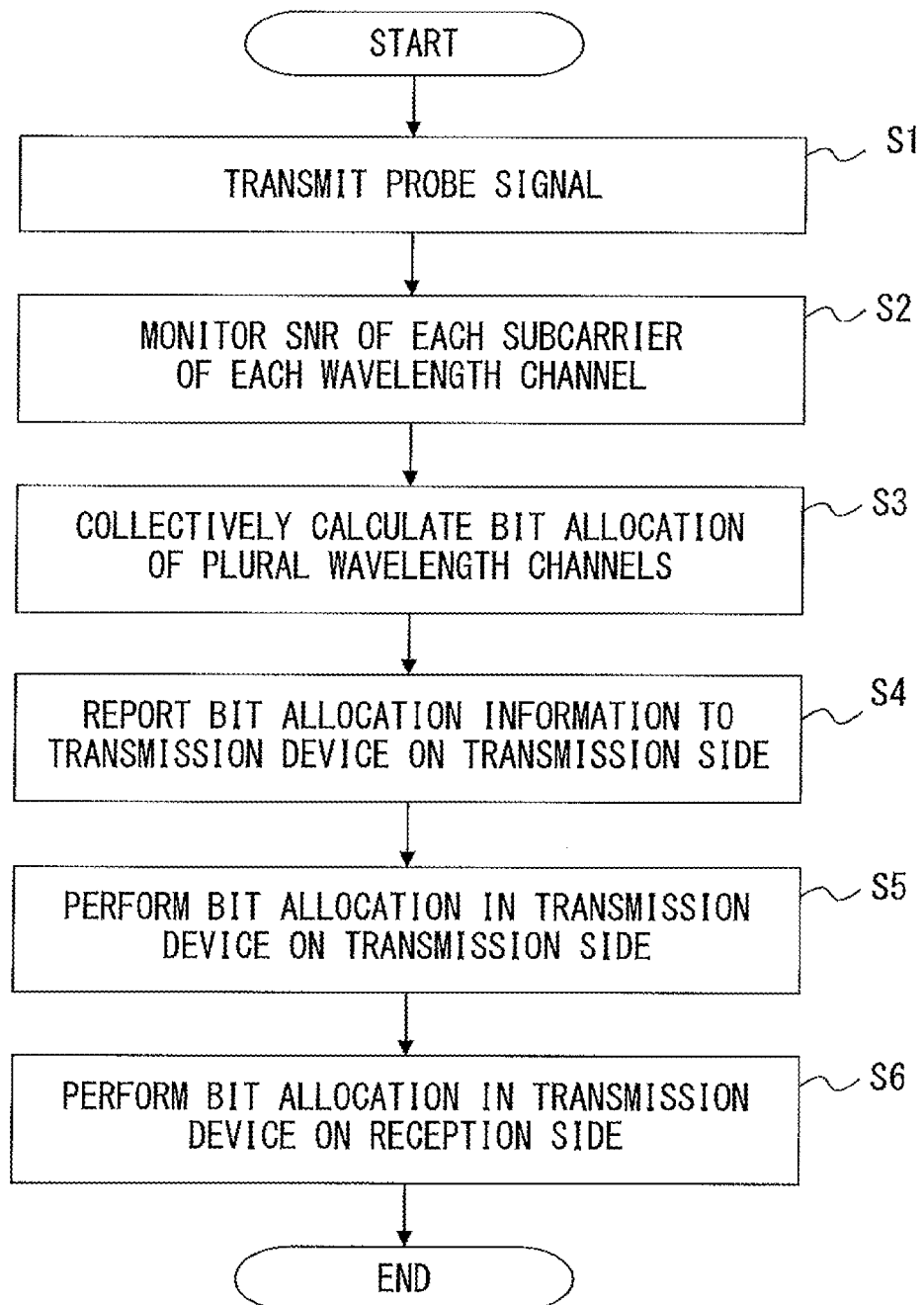
FIG. 9 is a flowchart illustrating a method for generating a multicarrier signal according to the first embodiment.

FIG. 9 is a flowchart illustrating a method for generating multicarrier signals according to the first embodiment. Processes in this flowchart are performed by the transmission device on the transmission side and the transmission device on the reception side. Further, the processes in this flowchart are performed, for example, before data communication is initiated.

In S1, the transmission device 10 on the transmission side initiates transmission of a probe signal. The probe signal is realized, for example, by transmitting specified data patterns via respective subcarriers of respective wavelength channels in the same modulation scheme. At this time, it is preferable that transmission power of the respective subcarriers be the same as each other.

In S2, the transmission device 20 on the reception side detects transmission characteristics of the respective subcarriers of the respective wavelength channels. The transmission characteristics of the respective subcarriers are detected by the transmission characteristic monitor 26. In this example, the transmission characteristic monitor 26 detects SNRs of the respective subcarriers.

In S3, the bit allocation calculator 27 calculates the number of bits allocated to the respective subcarriers in accordance with the SNRs of the respective subcarriers. At this time, the bit allocation calculator 27 collectively calculates the number of bits allocated to the respective subcarriers of a plurality of wavelength channels. The "number of bits" means the number of bits transmitted per symbol. Accordingly, the bit allocation calculator 27 substantially determines modulation schemes of the respective subcarriers. A method for calculating bit allocation is described later in detail.

In S4, the bit allocation calculator 27 transmits bit allocation information indicating the number of bits allocated to each of the subcarriers to the bit allocation provider 16. Namely, the bit allocation information is reported from the transmission device 20 on the reception side to the transmission device 10 on the transmission side.

In S5, the transmission device 10 performs bit allocation in accordance with the obtained bit allocation information. At this time, the bit allocation provider 16 issues a distribution instruction generated according to the bit allocation information to the Tx transmission capacity allocator 12. The bit allocation provider 16 also issues bit allocation instructions indicating the bit allocation information to the DMT modulators 13-1 to 13-4. As a result, the transmission device 10 can determine a ratio of transmission bandwidths allocated to the respective wavelength channels in accordance with the transmission characteristics of the respective subcarriers of the respective wavelength channels. For the respective wavelength channels, the number of bits allocated to the respective subcarriers are determined in accordance with the transmission characteristics of the respective subcarriers. Accordingly, as an example, a wide transmission band is allocated to a wavelength channel with a high SNR, and a narrow transmission band is allocated to a wavelength channel with a low SNR, and therefore data transmission efficiency is improved.

In S6, the transmission device 20 performs bit allocation in accordance with the bit allocation information. At this time, the bit allocation calculator 27 issues the bit allocation instruction indicating the bit allocation information to the DMT demodulators 23-1 to 23-4. The bit allocation calculator 27 issues the distribution instruction generated according to the bit allocation information to the Rx transmission capacity allocator 24. Therefore, the transmission device 20 can recover data from the modulated signal received from the transmission device 10.

Figure 10:
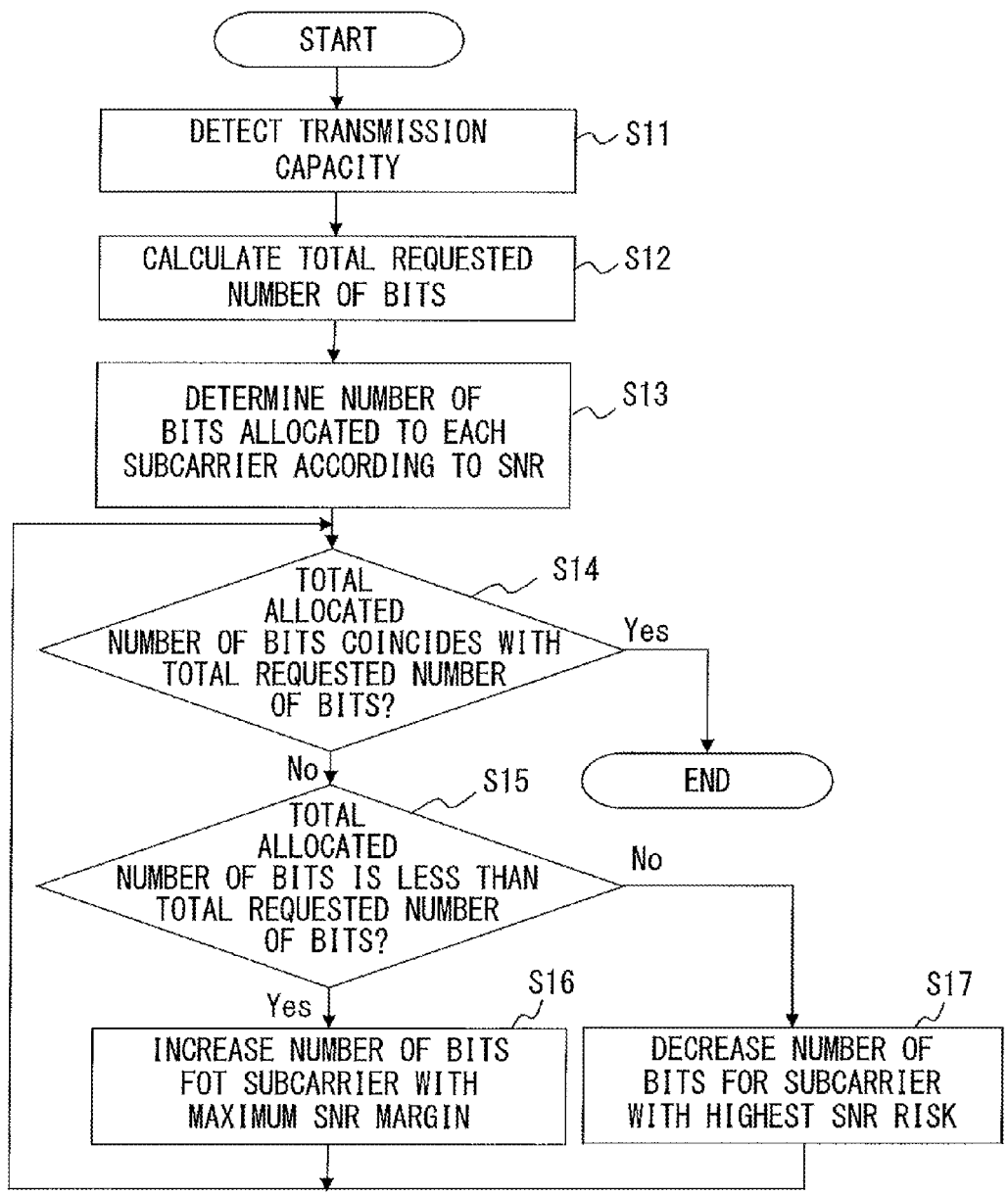
FIG. 10 is a flowchart illustrating an example of a method for calculating bit allocation.

FIG. 10 is a flowchart illustrating a method for calculating bit allocation. Processes in this flowchart correspond to S3 of FIG. 9. Accordingly, the processes in the flowchart illustrated in FIG. 10 are performed, for example, by the bit allocation calculator 27.

In S11, the bit allocation calculator 27 detects a total transmission capacity of data transmitted from the transmission device 10 to the transmission device 20. In this example, information indicating the total transmission capacity of the data transmitted from the transmission device 10 to the transmission device 20 is given from a network administrator to the bit allocation calculator 27.

In S12, the bit allocation calculator 27 calculates the number of bits requested to be transmitted in one symbol time, in accordance with the total transmission capacity of data. In the description below, this number of bits may be referred to as a "total requested number of bits". The total requested number of bits is calculated in accordance with the total transmission capacity of data and symbol rates of the respective subcarriers. As an example, in a case in which the total transmission capacity of data is 464 Gbps and the symbol rate is 200 Msymbol/s, the total requested number of bits is "2320".

In S13, the bit allocation calculator 27 determines the number of bits allocated to each of the subcarriers in accordance with the SNR of each of the subcarriers. At this time, the bit allocation calculator 27 determines the number of bits allocated to each of the subcarriers in accordance with a allowable SNR requested in each modulation scheme. The allowable SNR for each of the modulation schemes is determined, for example, according to a target bit error rate and a specifies margin. The bit allocation calculator 27 may determine a pre-emphasis amount in addition to the number of bits allocated to each of the subcarriers.

In S14 and S15, the bit allocation calculator 27 compares a total allocated number of bits with the total requested number of bits. The total allocated number of bits is the sum of the number of bits allocated to the respective subcarriers. When the total allocated number of bits is less than the total requested number of bits, the bit allocation calculator 27 selects a subcarrier with a maximum SNR margin. Namely, a subcarrier having the largest difference between the detected SNR and a corresponding allowable SNR is selected from among subcarriers for which the detected SNR is greater than the allowable SNR. The bit allocation calculator 27 then increases the number of bits allocated to the selected subcarrier.

As an example, from among subcarriers to which "2 bits (QPSK)" has been allocated, a subcarrier for which the detected SNR is greater than SNR_QPSK and a difference between the detected SNR and SNR_QPSK is the largest is selected. Then allocation to the selected subcarrier is changed from "2 bits (QPSK)" to "3 bits (8PSK)" or "4 bits (16QAM)". Note that SNR_QPSK represents an allowable SNR specified for QPSK.

When the total allocated number of bits is greater than the total requested number of bits, the bit allocation calculator 27 selects a subcarrier with the highest SNR risk in S17. Namely, when there are subcarriers for which the detected SNR is less than a corresponding allowable SNR, a subcarrier for which a difference between the detected SNR and the corresponding allowable SNR is the largest is selected from among the subcarriers. When there are no subcarriers for which the detected SNR is less than the corresponding allowable SNR, a subcarrier for which a difference between the detected SNR and the corresponding allowable SNR is the smallest is selected from among subcarriers for which the detected SNR is greater than the corresponding allowable SNR. The bit allocation calculator 27 then decreases the number of bits allocated to the selected subcarriers.

As an example, from among subcarriers to which "4 bits (QPSK)" has been allocated, a subcarrier for which the detected SNR is less than SNR_16QAM and a difference between the detected SNR and SNR_16QAM is the largest is selected. Then allocation to the selected subcarrier is changed from "4 bits (16QAM)" to "3 bits (8PSK)" or "2 bits (QPSK)". Note that SNR_16QAM represents an allowable SNR specified for 16QAM.

The processes of S14-S17 are repeatedly performed until the total allocated number of bits coincides with the total requested number of bits. Accordingly, bit allocation that satisfies the total transmission capacity of data is determined. The total allocated number of bits does not always completely coincide with the total requested number of bits. As an example, when the total allocated number of bits is greater than the total requested number of bits but when a difference between the total allocated number of bits and the total requested number of bits is satisfactorily small, the processes in the flowchart of FIG. 10 may be finished.

FIG. 11 illustrates an example of bit allocation according to the first embodiment. In this example, it is assumed that SNRs illustrated in FIG. 11 are detected by the transmission characteristic monitor 26. In this example, four wavelength channels λ1-λ4 are multiplexed and transmitted between the transmission devices 10 and 20. DMT signals transmitted via the respective wavelength channels transmit data signals by using four subcarriers SC1-SC4. Symbol rates of data transmitted via the respective subcarriers are the same as each other.

The transmission devices 10 and 20 can use QPSK and 16QAM as a modulation scheme for a subcarrier. In QPSK, 2-bit information is transmitted per symbol. In 16QAM, 4-bit information is transmitted per symbol.

An allowable SNR of 16QAM is "17.5 dB", and an allowable SNR of QPSK is "14.0 dB". Namely, in a subcarrier for which the SNR is greater than 14.0 dB, when data is transmitted in QPSK, an error rate is lower than a corresponding target level. Similarly, in a subcarrier for which the SNR is greater than 17.5 dB, when data is transmitted in 16QAM, an error rate is lower than a corresponding target level. Note that the SNRs illustrated in FIG. 11 is values for explanation. Further, the total requested number of bits calculated according to the total transmission capacity of data transmitted from the transmission device 10 to the transmission device 20 is "52 (bits/symbol)".

Under the conditions above, the bit allocation calculator 27 calculates the number of bits allocated to each of the subcarriers according to the flowchart of FIG. 10. In this example, as initial allocation, "4 bits (16QAM)" is allocated to a subcarrier for which the SNR is greater than or equal to 17.5 dB. Namely, "4 bits" is allocated to subcarriers SC1-SC4 in the wavelength channel λ1, subcarriers SC1-SC2 in the wavelength channel λ2, and subcarriers SC1-SC2 in the wavelength channel λ3. "2 bits (QPSK)" is allocated to a subcarrier for which the SNR is greater than or equal to 14.0 dB, and is less than 17.5 dB. Namely, "2 bits" is allocated to subcarriers SC3-SC4 in the wavelength channel λ2, subcarriers SC3-SC4 in the wavelength channel λ3, and subcarriers SC1-SC4 in the wavelength channel λ4.

In this case, the total allocated number of bits is "48". Namely, the total allocated number of bits is less than the total requested number of bits, and therefore the process of S16 in the flowchart illustrated in FIG. 10 is performed. In this example, only QPSK and 16QAM can be used. Accordingly, in order to increase the total allocated number of bits, among subcarriers to which "2 bits (QPSK)" has been allocated, the number of bits of a subcarrier with the maximum SNR margin is increased.

In the example illustrated in FIG. 11, among subcarriers to which "2" has been allocated, a subcarrier with the maximum SNR margin is SC1 in the wavelength channel λ4 (SNR=17.4 dB). Accordingly, the bit allocation calculator 27 increases the number of bits of the subcarrier SC1 in the wavelength channel λ4 from "2" to "4". As a result, the total allocated number of bits is "50".

However, the total allocated number of bits is still less than the total requested number of bits. Therefore, the process of S16 is performed again. Then, among subcarriers to which "2" has been allocated, a subcarrier with the maximum SNR margin is SC3 in the wavelength channel λ2 (SNR=17.3 dB). Accordingly, the bit allocation calculator 27 increases the number of bits of the subcarrier SC3 in the wavelength channel λ2 from "2" to "4". As a result, the total allocated number of bits is "52". Namely, the total allocated number of bits coincides with the total requested number of bits. Thus, the bit allocation calculator 27 finishes the bit allocation process.

The bit allocation provider 16 generates the distribution instruction and the bit allocation instruction in accordance with the calculation result above. Here, the numbers of bits allocated to the wavelength channels λ1, λ2, λ3, and λ4 are respectively "16", "14", "12", and "10", as illustrated in FIG. 11. Accordingly, the bit allocation provider 16 generates a distribution instruction to distribute input data to the DMT modulators 13-1, 13-2, 13-3, and 13-4 at a ratio of 16:14:12:10.

The bit allocation provider 16 issues, to the DMT modulator 13-1, a bit allocation instruction to allocate 4 bits respectively to the subcarriers SC1-SC4. As a result, four 16QAM signals are transmitted via the wavelength channel λ1. Similarly, the bit allocation provider 16 issues, to the DMT modulator 13-2, a bit allocation instruction to allocate four bits respectively to the subcarriers SC1-SC3 and to allocate two bits to the subcarrier SC4. As a result, three 16QAM signals and one QPSK signal are transmitted via the wavelength channel λ2. Similarly, the bit allocation provider 16 issues, to the DMT modulator 13-3, a bit allocation instruction to allocate four bits respectively to the subcarriers SC1-SC2 and to allocate two bits respectively to the subcarriers SC3-SC4. As a result, two 16QAM signals and two QPSK signals are transmitted via the wavelength channel λ3. Similarly, the bit allocation provider 16 issues, to the DMT modulator 13-4, a bit allocation instruction to allocate four bits to the subcarrier SC1 and to allocate two bits respectively to the subcarriers SC2-SC4. As a result, one 16QAM signal and three QPSK signals are transmitted via the wavelength channel λ4.

In the example illustrated in FIG. 11, in the subcarrier SC3 in the wavelength channel λ2 and the subcarrier SC1 in the wavelength channel λ4, the detected SNRs are less than the allowable SNR of 16QAM. Therefore, in these subcarriers, an error rate may deteriorate. However, in this example, among subcarriers to which "2 bits (QPSK)" has been allocated, a subcarrier with the maximum SNR margin is selected, and a modulation scheme of the selected subcarrier is changed from QPSK to 16QAM. Therefore, deterioration in the error rate can be minimized.

As described above, according to the first embodiment, transmission bandwidths are allocated to respective wavelength channels according to transmission characteristics of respective subcarriers of the respective wavelength channels, and bits are allocated to the respective subcarriers in the respective wavelength channels. At this time, a wide transmission band is allocated to a wavelength channel for which a transmission characteristic is good, and a narrow transmission band is allocated to a wavelength channel for which a transmission characteristic is not so good. Stated another way, a difference in the transmission characteristic between the respective wavelength channels is averaged. Accordingly, even when the transmission characteristics (for example, penalties due to chromatic dispersion) of the respective wavelength channels are different from each other, a decrease in data transmission efficiency of a WDM optical signal can be avoided or suppressed.

Second Embodiment

Figure 12:
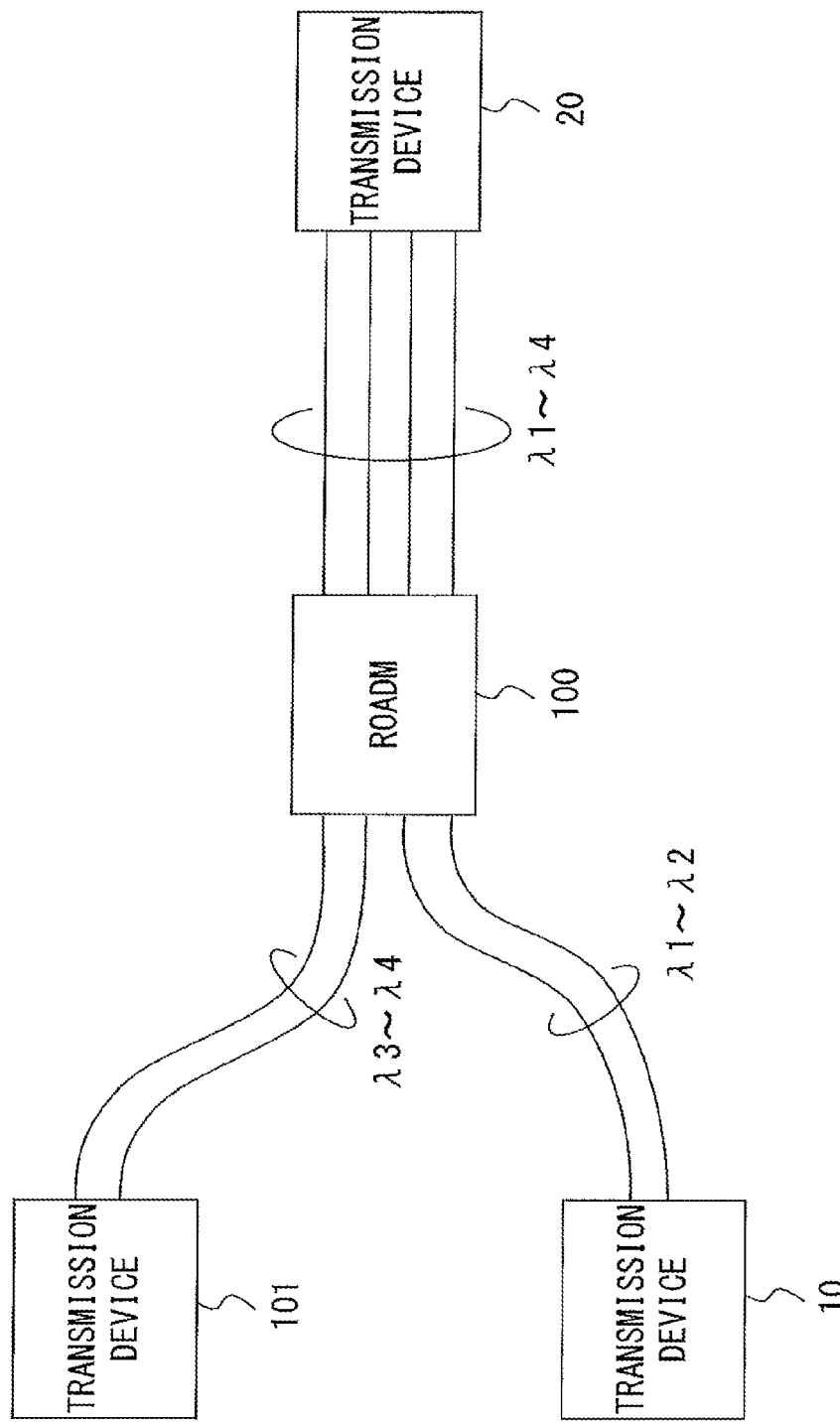
FIG. 12 is a diagram explaining a source node of a wavelength channel.

In a WDM transmission system, a path can be established for each wavelength channel. In the WDM transmission system illustrated in FIG. 12, for example, wavelength channels λ1-λ2 are provided between transmission devices 10 and 20, and wavelength channels λ3-λ4 are provided between transmission devices 101 and 20. A ROADM (Reconfigurable Optical Add-Drop Multiplexer) 100 can drop a specified wavelength channel from a WDM optical signal, and can add a specified wavelength channel into the WDM optical signal.

A transmission device according to the second embodiment allocates bits to each data source node. In the example illustrated in FIG. 12, the transmission device 20 receives data from the transmission device 10 via the wavelength channels λ1-λ2, and receives data from the transmission device 101 via the wavelength channels λ3-λ4. In this case, the transmission device 20 calculates bit allocation of data transmitted from the transmission device 10 to the transmission device 20 according to transmission characteristics of respective subcarriers of the wavelength channels λ1-λ2, and calculates bit allocation of data transmitted from the transmission device 101 to the transmission device 20 according to transmission characteristics of respective subcarriers of the wavelength channels λ3-λ4.

Figure 13:
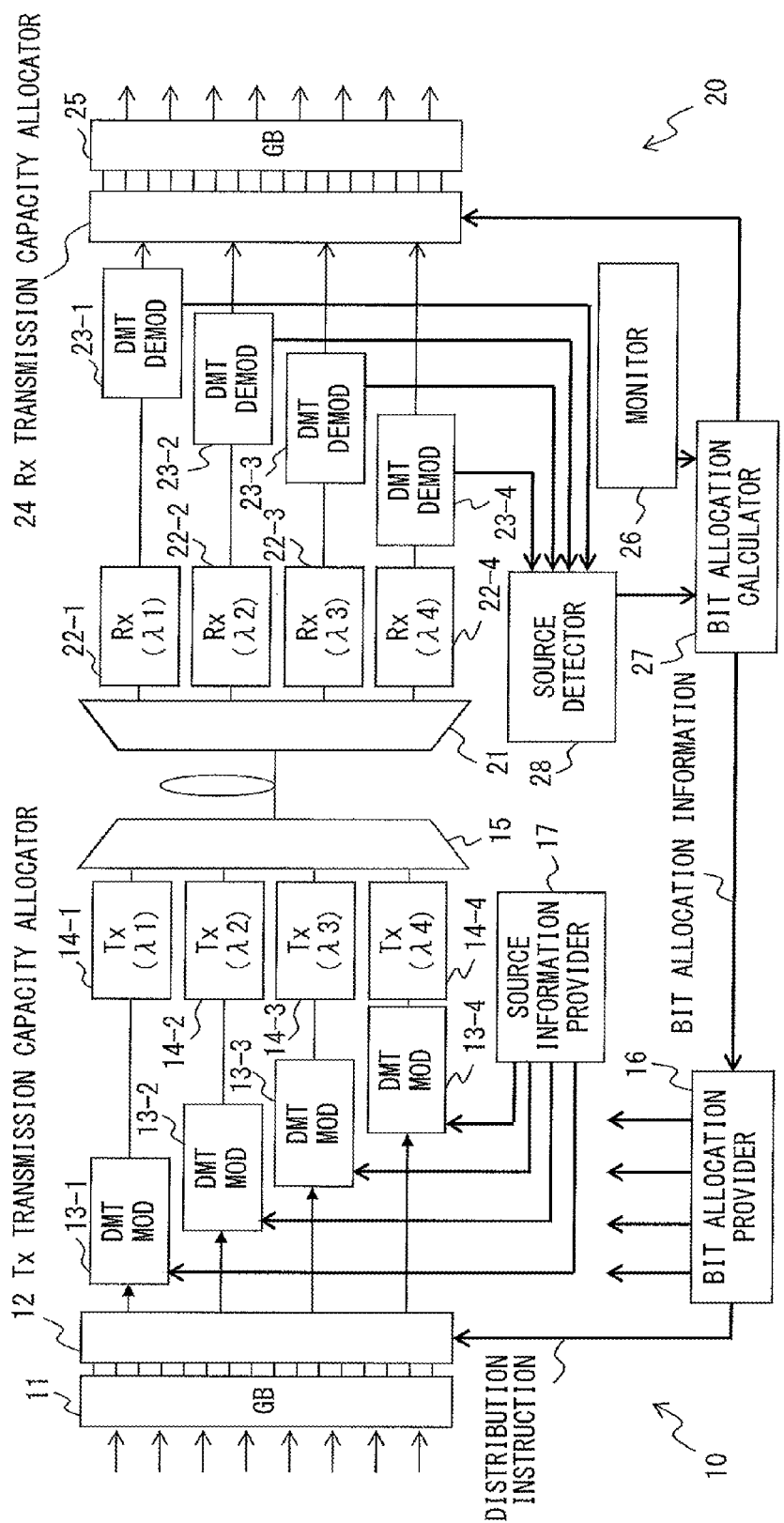
FIG. 13 illustrates an example of an optical transmission system according to the second embodiment.

FIG. 13 illustrates an example of an optical transmission system according to the second embodiment. In the optical transmission system according to the second embodiment, the transmission device 10 provided on the transmission side includes a source information provider 17 in addition to the configuration illustrated in FIG. 3. The transmission device 20 provided on the reception side includes a source information detector 28 in addition to the configuration illustrated in FIG. 3.

In FIG. 13, for simplicity of this diagram, signal lines between the bit allocation provider 16 and the DMT modulators 13-1 to 13-4 are omitted. In addition, signal lines between the DMT demodulators 23-1 to 23-4 and the transmission characteristic monitor 26 are omitted.

The source information provider 17 adds source information to a probe signal used in a sequence for determining bit allocation. The source information includes information identifying a transmission device equipped with the source information provider 17 (namely, the transmission device 10).

Figure 14:
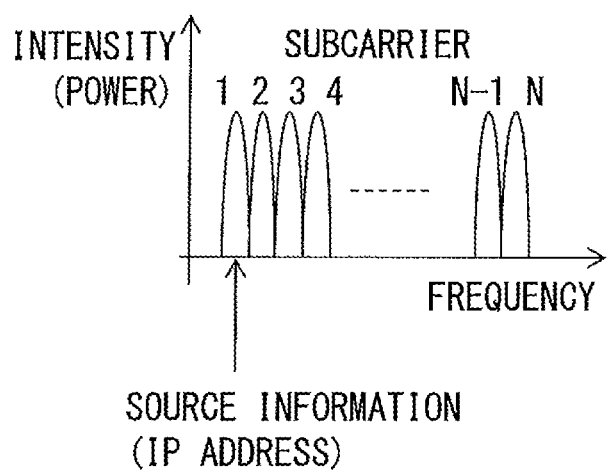
FIG. 14 illustrates an example of a method for transmitting source information.

The source information is transmitted, for example, by using one of a plurality of subcarriers used in respective wavelength channels. As illustrated in FIG. 14, for example, the source information is transmitted by using a subcarrier SC1 of a plurality of subcarriers SC1-SCN. The source information is realized, for example, by IP address of a source transmission device. The source information may include other information. As an example, the source information may include information identifying a number of a subcarrier to which the source information is added and a wavelength channel.

In this case, the following source information is given to the DMT modulator 13-1.
"subcarrier SC1, IP address of transmission device 10, wavelength channel λ1"
Similarly, the following pieces of source information are given to the DMT modulators 13-2 to 13-4, respectively.
"subcarrier SC1, IP address of transmission device 10, wavelength channel λ2"
"subcarrier SC1, IP address of transmission device 10, wavelength channel λ3"
"subcarrier SC1, IP address of transmission device 10, wavelength channel λ4"
Each of the DMT modulators 13-1 to 13-4 adds the given source information to a DMT signal. Namely, the source information is added to each of the DMT signals transmitted via the respective wavelength channels.

The source information detector 28 detects the source information from output signals of the DMT demodulators 23-1 to 23-4. Namely, source nodes of the respective wavelength channels are detected. In the example illustrated in FIG. 12, for example, the source information detector 28 of the transmission device 20 detects that source node of the wavelength channels λ1-λ2 is the transmission device 10 and that source node of the wavelength channels λ3-λ4 is the transmission device 101.

The bit allocation calculator 27 calculates bit allocation of respective subcarriers according to transmission characteristics of the respective subcarriers. A method for calculating bit allocation according to the second embodiment is substantially the same as the method according to the first embodiment. However, in the second embodiment, the bit allocation calculator 27 refers to a detection result of the source information detector 28, and calculates bit allocation for each group of wavelength channels having the same source.

Figure 15:
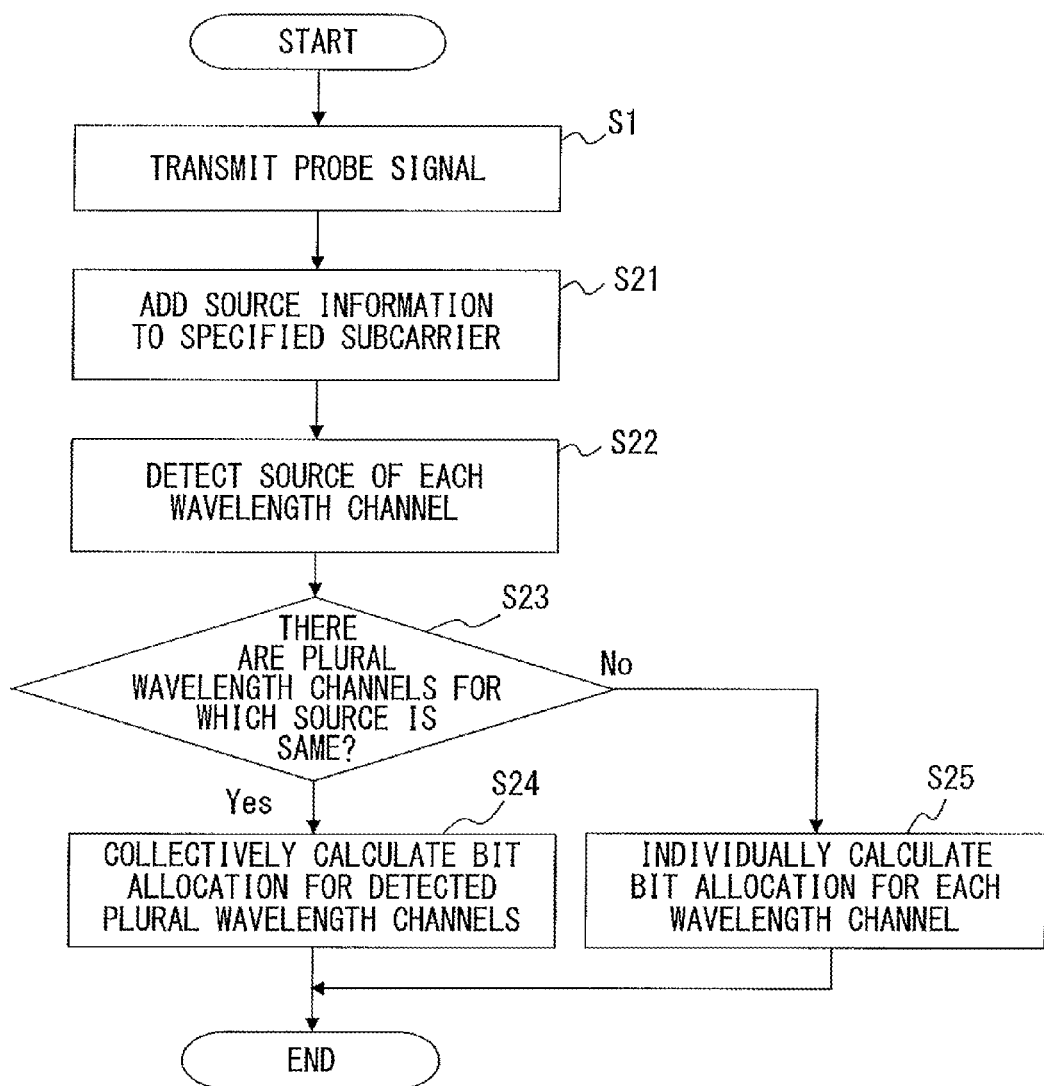
FIG. 15 is a flowchart illustrating a method for calculating bit allocation according to the second embodiment.

FIG. 15 is a flowchart illustrating a method for calculating bit allocation according to the second embodiment. A transmission device on a transmission side initiates transmission of a probe signal for calculating bit allocation in S1, similarly to the first embodiment.

In S21, the source information provider 17 adds the source information to a specified subcarrier in a DMT signal for each wavelength channel. In the example illustrated in FIG. 14, IP address is transmitted by using a subcarrier SC1.

In S22-S23, the source information detector 28 of a transmission device on a reception side detects a source node of each of the wavelength channels. The bit allocation calculator 27 determines whether there are a plurality of wavelength channels for which a source node is the same as each other. When there are a plurality of wavelength channels for which a source node is the same as each other, the bit allocation calculator 27 collectively calculates bit allocation for the plurality of wavelength channels in S24. In the example illustrated in FIG. 12, source nodes of the wavelength channels λ1-λ2 are the same as each other, and therefore the bit allocation calculator 27 collectively calculates bit allocation for data signals transmitted via the wavelength channels λ1-λ2. When there is not a plurality of wavelength channels for which a source node is the same as each other, the bit allocation calculator 27 individually calculates bit allocation for respective wavelength channels in S25.

Third Embodiment

Figure 16:
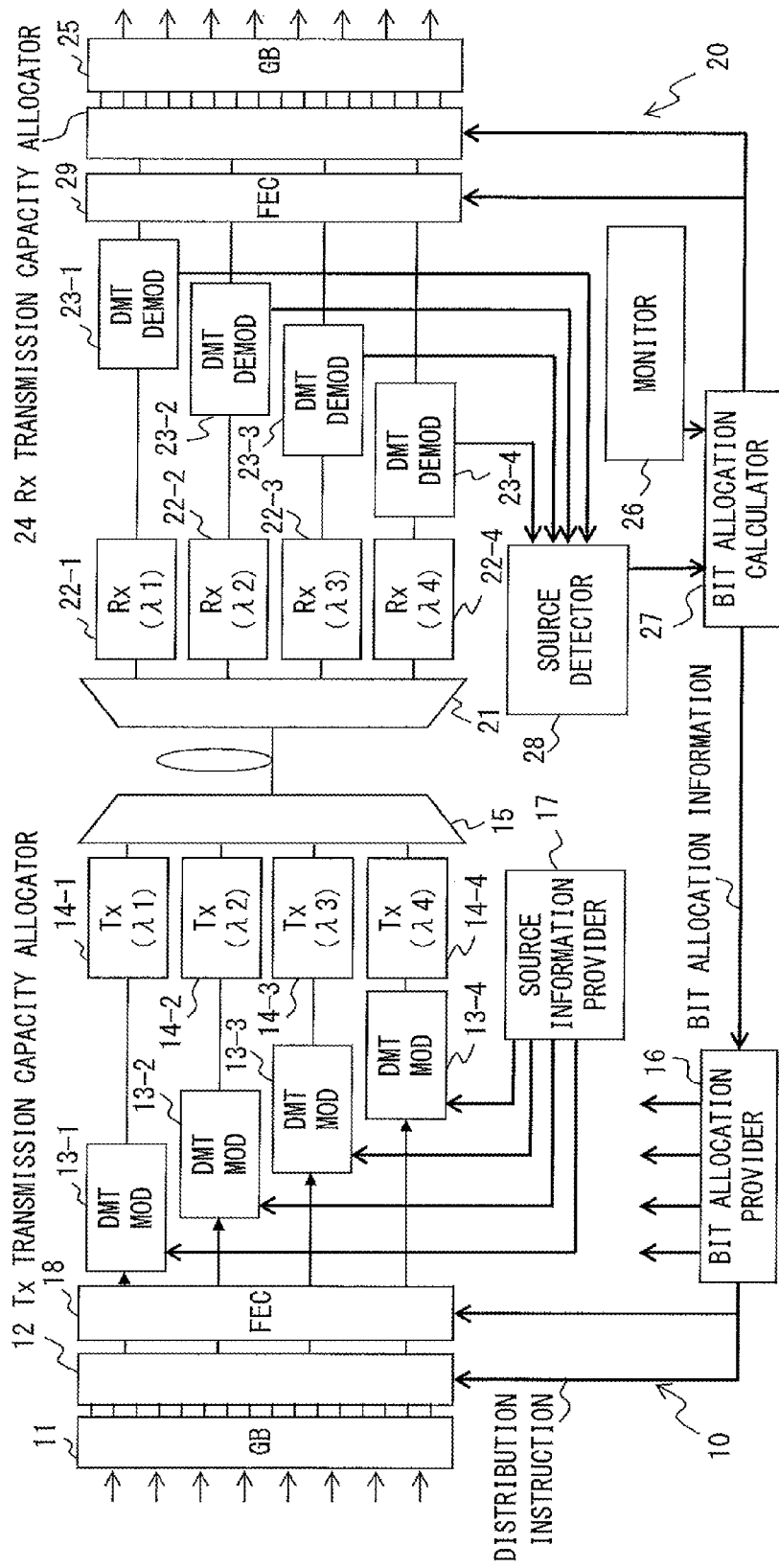
FIG. 16 illustrates an example of an optical transmission system according to the third embodiment.

FIG. 16 illustrates an example of an optical transmission system according to the third embodiment. In the optical transmission system according to the third embodiment, a transmission device 10 provided on a transmission side includes a variable FEC encoder 18 in addition to the configuration illustrated in FIG. 3 or FIG. 13. A transmission device 20 provided on a reception side includes a variable FEC decoder 29 in addition to the configuration illustrated in FIG. 3 or FIG. 13.

The variable FEC encoder 18 gives an FEC to data signals transmitted via respective wavelength channels in accordance with an FEC instruction issued from a bit allocation provider 16. The bit allocation provider 16 can generate the FEC instruction in accordance with bit allocation calculated by the bit allocation calculator 27. The variable FEC decoder 29 performs an error correction process that corresponds to the FEC given by the variable FEC encoder 18 in accordance with the bit allocation calculated by the bit allocation calculator 27.

As an example, the bit allocation calculator 27 calculates an average SNR for each of the wavelength channels. The average SNR represents an average of SNRs of a plurality of subcarriers in a wavelength channel. The bit allocation provider 16 determines an FEC to be applied to respective wavelength channels in accordance with the average SNR. In this case, an FEC with a small code gain is applied to a wavelength channel with a high average SNR, and an FEC with a large code gain is applied to a wavelength channel with a low average SNR.

As an example, in the example illustrated in FIG. 4, as a wavelength of an optical signal becomes long, a transmission penalty increases. In this case, the average SNRs of the wavelength channels λ3 and λ4 are lower than those of the wavelength channels λ1 and λ2.

Here, it is assumed that the transmission devices 10 and 20 can use a plurality of FECs that have been prepared in advance. As an example, the transmission devices 10 and 20 can use the following three FECs.

FEC1: BCH, 906 bits, gain=6.6 dB
FEC2: BCH, 3965 bits, gain=8.4 dB
FEC3: Concatenated BCH, 38016 bits, gain=11.0 dB In this case, as an example, FEC1 is applied to a wavelength channel for which the average SNR is greater than a specified threshold, and FEC2 or FEC3 is applied to a wavelength channel for which the average SNR is less than the specified threshold.

In the optical transmission system described above, the bit allocation calculator 27 can specify a deteriorated subcarrier that may deteriorate in quality. The bit allocation calculator 27 may report information identifying the deteriorated subcarrier to the bit allocation provider 16, in addition to the bit allocation information.

In the example illustrated in FIG. 11, for example, in determination according to the detected SNR, "2 bits (QPSK)" is supposed to be allocated to the subcarrier SC3 in the wavelength channel λ2 and the subcarrier SC1 in the wavelength channel λ4. However, "4 bits (16QAM)" is allocated to these subcarriers. Therefore, the bit allocation calculator 27 specifies these subcarriers to be deteriorated subcarriers.

Then, the bit allocation provider 16 applies an FEC scheme with a large code gain to a wavelength channel including the specified deteriorated subcarriers. In the example above, an FEC scheme with a large code gain is applied to data signals transmitted via the wavelength channels λ2 and λ4. In this case, as an example, FEC1 may be applied to the wavelength channels λ1 and λ3, and FEC2 or FEC3 may be applied to the wavelength channels λ2 and λ4.

As described above, according to the third embodiment, an FEC with a large code gain is applied to a wavelength channel with a low average SNR or a wavelength channel including a subcarrier that may deteriorate in quality. Accordingly, reduction in an error rate can be achieved while improving data transmission efficiency.

The transmission devices 10 and 20 according to the third embodiment are not limited to a transmission device with the configuration illustrated in FIG. 16. As an example, the transmission device 10 may fail to include the Tx transmission capacity allocator 12. In this case, the transmission device 20 may fail to include the Rx transmission capacity allocator 24.

Fourth Embodiment

Figure 17:
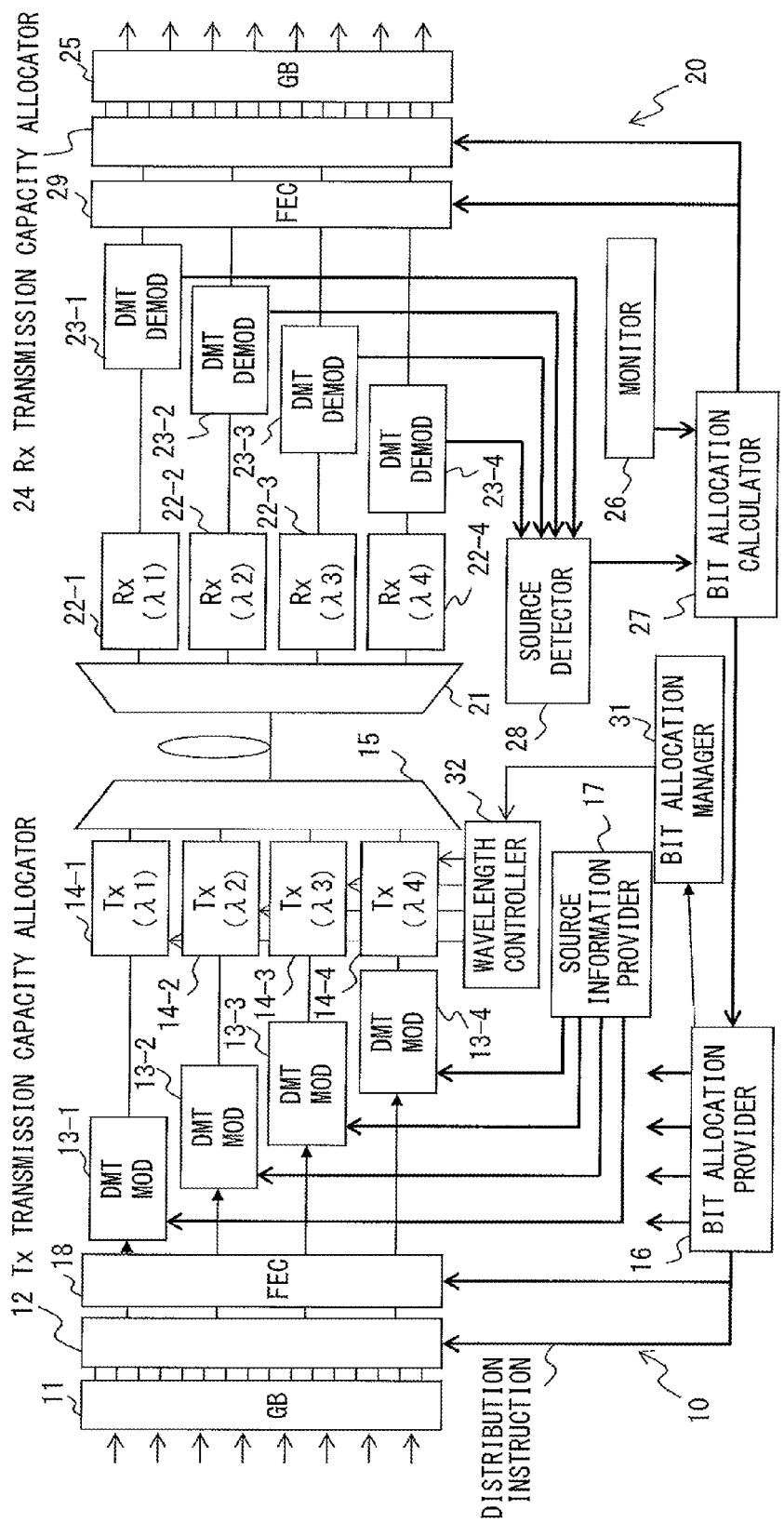
FIG. 17 illustrates an example of an optical transmission system according to the fourth embodiment.

FIG. 17 illustrates an example of an optical transmission system according to the fourth embodiment. In the optical transmission system according to the fourth embodiment, a transmission device 10 provided on a transmission side includes a bit allocation manager 31 and a wavelength controller 32 in addition to the configuration illustrated in FIG. 3, FIG. 13, or FIG. 16. A transmission device 20 provided on a reception side has substantially the same configuration as the configuration illustrated in FIG. 3, FIG. 13, or FIG. 16.

The bit allocation manager 31 includes a memory, and target bit allocation information indicating preferable bit allocation is stored in the memory. The preferable bit allocation corresponds, for example, to bit allocation determined in a bit allocation process performed before initiation of data communication.

In the optical transmission system according to the fourth embodiment, bit allocation is recalculated for example periodically. The bit allocation manager 31 compares the bit allocation obtained as a result of recalculation with the preferable bit allocation indicated in the target bit allocation information. As a result of this, when a difference is greater than a specified threshold, the bit allocation manager 31 issues a wavelength control instruction to the wavelength controller 32. As an example, when SNRs of respective subcarriers of the wavelength channel $\lambda 4$ decrease and the number of bits that can be allocated to the subcarriers in the wavelength channel $\lambda 4$ decreases, the bit allocation manager 31 issues an instruction to adjust a wavelength of the wavelength channel $\lambda 4$ to the wavelength controller 32. As an example, when a transmission penalty due to chromatic dispersion increases, in the examples illustrated in FIGS. 2A-2C, the transmission penalty can be suppressed by shortening a carrier wavelength. In this case, the wavelength controller 32 shortens a wavelength of output light of a laser source of the optical transmitter 14-4 by a specified amount. When a wavelength of the laser source depends on temperature, the wavelength controller 32 controls temperature of the laser source of a target optical transmitter.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission device comprising:
a plurality of modulators that respectively generate multicarrier signals from given data, each of the multicarrier signals including a plurality of subcarriers;
a distributor that distributes input data to the plurality of modulators;
an optical circuit that multiplexes the multicarrier signals generated by the plurality of modulators to generate a WDM (wavelength division multiplexed) optical signal; and
a controller that obtains allocation information from a receiver that receives the WDM optical signal and generates a distribution instruction to control the distributor and a bit allocation instruction to control the plurality of modulators according to the allocation information, the allocation information indicating a number of bits of data allocated to each subcarrier included in the respective multicarrier signals, wherein
the distributor distributes the input data to the plurality of modulators according to the distribution instruction,
the plurality of modulators respectively allocate data distributed from the distributor to subcarriers included in the respective multicarrier signals according to the bit allocation instruction to generate the multicarrier signals, and
the allocation information is generated by calculating a total requested number of bits according to a total capacity of data transmitted by the multicarrier signals and symbol rates of the multicarrier signals, the total requested number of bits indicating a number of bits transmitted by the WDM optical signal in one symbol time, and by collectively calculating the number of bits of data allocated to each subcarrier included in the respective multicarrier signals based on transmission characteristics of each subcarrier included in the respective multicarrier signals in such a way that the sum of the number of bits allocated to each subcarrier included in the respective multicarrier signals coincides or approximately coincides with the total requested number of bits.

2. A transmission device comprising:
a plurality of modulators that respectively generate multicarrier signals from given data, each of the multicarrier signals including a plurality of subcarriers;
a distributor that distributes input data to the plurality of modulators;
an encoder that gives an error correction code to the input data distributed to each of the plurality of modulators by the distributor;
an optical circuit that multiplexes the multicarrier signals generated by the plurality of modulators to generate a WDM (wavelength division multiplexed) optical signal; and
a controller that obtains allocation information from a receiver that receives the WDM optical signal and generates a distribution instruction to control the distributor and a bit allocation instruction to control the plurality of modulators according to the allocation information, the allocation information being calculated based on transmission characteristics of each subcarrier included in the respective multicarrier signals and the allocation information indicating a number of bits of data allocated to each subcarrier included in the respective multicarrier signals, wherein
the distributor distributes the input data to the plurality of modulators according to the distribution instruction,
the plurality of modulators respectively allocate data distributed from the distributor to subcarriers included in the respective multicarrier signals according to the bit allocation instruction to generate the multicarrier signals, and
the encoder determines the error correction code added to the input data that is distributed to each of the plurality of modulators according to quality of the respective multicarrier signals that are detected by the receiver.

3. A transmission device comprising:
a plurality of modulators that respectively generate multicarrier signals from given data, each of the multicarrier signals including a plurality of subcarriers;
a distributor that distributes input data to the plurality of modulators;

an optical circuit that multiplexes the multicarrier signals generated by the plurality of modulators to generate a WDM (wavelength division multiplexed) optical signal; and a controller that obtains allocation information from a receiver that receives the WDM optical signal and generates a distribution instruction to control the distributor and a bit allocation instruction to control the plurality of modulators according to the allocation information, the allocation information being calculated based on transmission characteristics of each subcarrier included in the respective multicarrier signals and the allocation information indicating a number of bits of data allocated to each subcarrier included in the respective multicarrier signals, wherein the distributor distributes the input data to the plurality of modulators according to the distribution instruction, the plurality of modulators respectively allocate data distributed from the distributor to subcarriers included in the respective multicarrier signals according to the bit allocation instruction to generate the multicarrier signals, and the controller controls optical wavelengths of the multicarrier signals according to the allocation information.

4. A transmission device that receives a WDM (wavelength division multiplexed) optical signal into which multicarrier signals are multiplexed, each of the multicarrier signals including a plurality of subcarriers, the transmission device comprising:

a plurality of demodulators that respectively demodulate the multicarrier signals multiplexed into the WDM optical signal; and a bit allocation calculator that generates allocation information and provides the allocation information to a transmitter that transmits the WDM optical signal, the allocation information indicating a number of bits of data allocated to each subcarrier included in the respective multicarrier signals, wherein the bit allocation calculator
  calculates a total requested number of bits according to a total capacity of data transmitted by the multicarrier signals and symbol rates of the multicarrier signals, the total requested number of bits indicating a number of bits transmitted by the WDM optical signal in one symbol time, and
  collectively calculates the number of bits of data allocated to each subcarrier included in the respective multicarrier signals based on transmission characteristics of each subcarrier included in the respective multicarrier signals in such a way that the sum of the number of bits allocated to each subcarrier included in the respective multicarrier signals coincides or approximately coincides with the total requested number of bits.

5. The transmission device according to claim 4, wherein the bit allocation calculator generates the allocation information indicating the number of bits of the data allocated to each subcarrier included in the respective multicarrier signals received from the same source node.

6. A transmission method for transmitting data from a first transmission device to a second transmission device, the transmission method comprising:

generating multicarrier signals from input data by using a plurality of modulators in the first transmission device, each of the multicarrier signals including a plurality of subcarriers;

transmitting a WDM (wavelength division multiplexed) optical signal from the first transmission device to the second transmission device, the WDM optical signal being generated by multiplexing the multicarrier signals;

demodulating each of the multicarrier signals multiplexed into the WDM optical signal in the second transmission device;

generating allocation information that indicates a number of bits of data allocated to each subcarrier included in the respective multicarrier signals;

distributing the input data to the plurality of modulators according to the allocation information; and allocating, by the plurality of modulators, the distributed input data to subcarriers included in the respective multicarrier signals according to the allocation information so as to generate the multicarrier signals, wherein the allocation information is generated by calculating a total requested number of bits according to a total capacity of data transmitted by the multicarrier signals and symbol rates of the multicarrier signals, the total requested number of bits indicating a number of bits transmitted by the WDM optical signal in one symbol time, and by collectively calculating the number of bits of data allocated to each subcarrier included in the respective multicarrier signals based on transmission characteristics of each subcarrier included in the respective multicarrier signals in such a way that the sum of the number of bits allocated to each subcarrier included in the respective multicarrier signals coincides or approximately coincides with the total requested number of bits.

7. A transmission method for transmitting data from a first transmission device to a second transmission device, the transmission method comprising:

generating multicarrier signals from input data by using a plurality of modulators in the first transmission device, each of the multicarrier signals including a plurality of subcarriers;

transmitting a WDM (wavelength division multiplexed) optical signal from the first transmission device to the second transmission device, the WDM optical signal being generated by multiplexing the multicarrier signals;

demodulating each of the multicarrier signals multiplexed into the WDM optical signal in the second transmission device;

generating allocation information according to transmission characteristics of each subcarrier included in the respective multicarrier signals, the allocation information indicating a number of bits of data allocated to each subcarrier included in the respective multicarrier signals;

distributing the input data to the plurality of modulators according to the allocation information;

determining an error correction code for the input data that is distributed to each of the plurality of modulators according to quality of the respective multicarrier signals;

adding the determined error correction code to corresponding input data; and allocating, by the plurality of modulators, the distributed input data to subcarriers included in the respective multicarrier signals according to the allocation information so as to generate the multicarrier signals.

8. A transmission method for transmitting data from a first transmission device to a second transmission device, the transmission method comprising:
- generating multicarrier signals from input data by using a plurality of modulators in the first transmission device, each of the multicarrier signals including a plurality of subcarriers;
- transmitting a WDM (wavelength division multiplexed) optical signal from the first transmission device to the second transmission device, the WDM optical signal being generated by multiplexing the multicarrier signals;
- demodulating each of the multicarrier signals multiplexed into the WDM optical signal in the second transmission device;
- generating allocation information according to transmission characteristics of each subcarrier included in the respective multicarrier signals, the allocation information indicating a number of bits of data allocated to each subcarrier included in the respective multicarrier signals;
- distributing the input data to the plurality of modulators according to the allocation information;
- allocating, by the plurality of modulators, the distributed input data to subcarriers included in the respective multicarrier signals according to the allocation information so as to generate the multicarrier signals, and
- controlling optical wavelengths of the multicarrier signals according to the allocation information.

* * * * *